United States Patent
Muramatsu et al.

(10) Patent No.: US 9,623,688 B2
(45) Date of Patent: Apr. 18, 2017

(54) DRIVING FORCE TRANSMISSION APPARATUS AND IMAGE FORMING APPARATUS USING THE SAME

(71) Applicant: CANON KABUSHIKI KAISHA, Tokyo (JP)

(72) Inventors: Motoyasu Muramatsu, Susono (JP); Takayuki Miyamoto, Kawasaki (JP); Chikara Imaizumi, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 14/358,937

(22) PCT Filed: Nov. 7, 2012

(86) PCT No.: PCT/JP2012/007131
§ 371 (c)(1),
(2) Date: May 16, 2014

(87) PCT Pub. No.: WO2013/073134
PCT Pub. Date: May 23, 2013

(65) Prior Publication Data
US 2014/0315680 A1    Oct. 23, 2014

(30) Foreign Application Priority Data

Nov. 17, 2011   (JP) ................................. 2011-251596
Nov. 17, 2011   (JP) ................................. 2011-251597
(Continued)

(51) Int. Cl.
| | |
|---|---|
| B41J 23/00 | (2006.01) |
| B41J 23/04 | (2006.01) |
| F16H 13/04 | (2006.01) |
| B41J 23/02 | (2006.01) |
| F16D 41/12 | (2006.01) |
| F16D 41/04 | (2006.01) |
| F16D 41/02 | (2006.01) |
| B65H 3/06 | (2006.01) |

(52) U.S. Cl.
CPC ............... *B41J 23/04* (2013.01); *B41J 23/00* (2013.01); *B41J 23/02* (2013.01); *B65H 3/0669* (2013.01);
(Continued)

(58) Field of Classification Search
CPC ...... F16H 31/00; F16H 31/001; F16H 31/003; F16H 31/004; F16H 29/14; F16H 29/12;
(Continued)

(56) References Cited

U.S. PATENT DOCUMENTS 3,236,348 A * 2/1966 Okcuoglu ............... F16D 11/06
                                                           192/28
4,292,105 A     9/1981 Taylor
(Continued)

FOREIGN PATENT DOCUMENTS

CN      101279546 A     10/2008
GB         935080 A      8/1963
(Continued)

*Primary Examiner* — William Kelleher
*Assistant Examiner* — Joseph H Brown
(74) *Attorney, Agent, or Firm* — Canon U.S.A., Inc. IP Division

(57) ABSTRACT

When an abutting member is in contact with a driving force transmission member that engages with a driving member, a biasing member biases the driving force transmission member in a direction where the driving force transmission member is disengaged from the driving member.

15 Claims, 30 Drawing Sheets

(30) Foreign Application Priority Data

Nov. 17, 2011 (JP) .................................. 2011-251598
Oct. 23, 2012 (JP) .................................. 2012-234027

(52) U.S. Cl.
CPC ............. *F16D 41/02* (2013.01); *F16D 41/04* (2013.01); *F16D 41/12* (2013.01); *F16H 13/04* (2013.01); *B65H 2403/72* (2013.01)

(58) Field of Classification Search
CPC .......... F16H 29/00; F16H 41/02; F16D 41/02; F16D 41/12; F16D 41/24; F16D 11/02; F16D 11/06; F16D 2011/006; F16D 2011/008; F16D 2011/026; F16D 41/04; B65H 2403/70; B65H 2403/72; B65H 2403/721; B65H 2403/722; B65H 2403/60; B65H 2403/61; B65H 3/06; B65H 3/0669; B41J 23/04; B41J 23/06; B41J 23/10; B41J 23/02
USPC ...... 74/434; 400/569; 24/577 R, 577 S, 575; 192/28, 33 R
See application file for complete search history.

(56) References Cited

U.S. PATENT DOCUMENTS

| | | | | |
|---|---|---|---|---|
| 4,403,672 A | * | 9/1983 | Jaulmes | F16D 11/06 180/205.4 |
| 4,427,035 A | * | 1/1984 | Hintsch | D03C 1/00 139/66 R |
| 4,542,769 A | * | 9/1985 | Julich | F16D 11/06 139/66 R |
| 4,929,105 A | * | 5/1990 | Hirayama | B41J 23/025 271/225 |
| 7,689,146 B2 | * | 3/2010 | Sato | G03G 21/1832 399/102 |
| 2008/0286011 A1 | * | 11/2008 | Aoki | G03G 15/0121 399/227 |
| 2008/0310902 A1 | * | 12/2008 | Kubota | B41J 3/4075 400/611 |

FOREIGN PATENT DOCUMENTS

| | | | | |
|---|---|---|---|---|
| GB | 2279117 A | * | 12/1994 | ............ B60T 7/122 |
| JP | S52-041755 A | | 3/1977 | |
| JP | 56-73232 A | | 7/1981 | |
| JP | 60-25776 A | | 2/1985 | |
| JP | 3-158328 A | | 7/1991 | |
| JP | 7-251964 A | | 10/1995 | |
| JP | 8-247166 A | | 9/1996 | |
| JP | 2004-002014 A | | 1/2004 | |
| JP | 2004002014 A | * | 1/2004 | |
| JP | 2007-92771 A | | 4/2007 | |
| JP | 2007-315573 A | | 12/2007 | |
| JP | 2008-38975 A | | 2/2008 | |
| JP | 2009-45913 A | | 3/2009 | |
| JP | 2009-169433 A | | 7/2009 | |
| JP | 2010-018368 A | | 1/2010 | |
| JP | 2010-244083 A | | 10/2010 | |
| JP | 2011-219200 A | | 11/2011 | |

* cited by examiner

DRIVING FORCE TRANSMISSION APPARATUS AND IMAGE FORMING APPARATUS USING THE SAME

CROSS-REFERENCE TO RELATED APPLICATIONS

This application claims priority from Japanese Patent Applications No. 2011-251596 filed Nov. 17, 2011, No. 2011-251597 filed Nov. 17, 2011, No. 2011-251598 filed Nov. 17, 2011, and No. 2012-234027 filed Oct. 23, 2012, which are hereby incorporated by reference herein in their entirety.

TECHNICAL FIELD

The present invention relates to a driving force transmission apparatus capable of stopping transmission of the driving force to a driven member from a driving member rotated by a driving source, and to an image forming apparatus using the driving force transmission apparatus.

BACKGROUND ART

Conventionally, in an image forming apparatus such as a copying machine, a printer, and a facsimile machine, a driving force transmission apparatus executing an intermittent rotation operation has been used as an abutting and separating mechanism for a transfer roller and as a sheet pick-up mechanism for a sheet feed unit, for example. Such a driving force transmission apparatus generally uses, for example, an electromagnetic clutch and a dedicated motor, to execute an intermittent rotation operation. However, since use of such an electromagnetic clutch and a dedicated motor results in a cost increase, Japanese Patent Application Laid-Open No. 3-158328 discusses a configuration that can be made at a lower cost.

FIGS. 13A and 13B schematically illustrate a configuration of a conventional driving force transmission apparatus discussed in Japanese Patent Application Laid-Open No. 3-158328. This configuration will be described below.

The driving force transmission apparatus includes a driving gear (driving member) 22 rotated in the direction of arrow A by a driving source (not illustrated) and a driven gear (driven member) 23 rotatable concentrically with the driving gear 22. The driven gear 23 holds a driving force transmission member 24 rotatable with respect to the driven gear 23 and movable between a position where the driving force transmission member 24 is engaged with the driving gear 22 and a position where the driving force transmission member 24 is disengaged from the driving gear 22.

As illustrated in FIG. 13A, when an engaging portion 24a of the driving force transmission member 24 is engaged with the driving gear 22, driving force is transmitted from the driving gear 22 to the driven gear 23 via the transmission member 24. As a result, the driven gear 23 and the driving force transmission member 24 are rotated in the direction of arrow A integrally with the driving gear 22.

To stop transmission of the driving force to the driven gear 23, as illustrated in FIG. 13B, an abutting member 17 is moved to a position where the abutting member 17 comes into contact with and locks the driving force transmission member 24. Accordingly, the driving force transmission member 24 and the driving gear 22 are disengaged from each other. In this way, transmission of the driving force from the driving gear 22 to the driven gear 23 is stopped.

According to Japanese Patent Application Laid-Open No. 3-158328, the driving force transmission member 24 is biased by a spring 25 so that the engaging portion 24a of the driving force transmission member 24 engages with the driving gear 22 without fail. Thus, to stop transmission of the driving force to the driven gear 23, the abutting member 17 needs to disengage the driving force transmission member 24 from the driving gear 22. More specifically, when the abutting member 17 comes into contact with the driving force transmission member 24, the abutting member 17 needs to separate (retract) the driving force transmission member 24 from the driving gear 22 against the force of the spring 25.

CITATION LIST

Patent Literature

PTL 1: Japanese Patent Application Laid-Open No. 3-158328

SUMMARY OF INVENTION

Technical Problem

Based on the configuration discussed in Japanese Patent Application Laid-Open No. 3-158328, as soon as the tip of the engaging portion 24a of the driving force transmission member 24 is disengaged from the driving gear 22, transmission of the driving force from the driving gear 22 to the driven gear 23 is stopped. Thus, rotation of the driven gear 23 is immediately stopped by the load on the driven gear 23. Consequently, when the rotation of the driven gear 23 is stopped, the tip of the engaging portion 24a of the driving force transmission member 24 may not be moved to a position where the engaging portion 24a is not sufficiently separated (retracted) from the driving gear 22.

In addition, normally, play such as a backlash exists between the driven gear 23 and a component located downstream of the driven gear 23 in a driving force transmission direction. When no driving force is transmitted from the driving gear 22, the driven gear 23 could be reversely rotated by such play. Thus, for example, if vibration is caused in the apparatus body and the driven gear 23 is reversely rotated thereby, the tip of the engaging portion 24a of the driving force transmission member 24 could collide with the driving gear 22 being rotated by the driving source. As a result, for example, a collision noise could be caused.

Solution to Problem

The present invention is directed to a driving force transmission apparatus and to an image forming apparatus using the driving force transmission apparatus. With the driving force transmission apparatus using a driven member holding a driving force transmission member that can engage with a driving member, the driving force transmission member can be retracted from the driving member without fail and generation of a collision noise or the like can be prevented.

According to an aspect of the present invention, a driving force transmission apparatus, includes a driving member configured to rotate by receiving driving force from a driving source, a driven member configured to concentrically rotate with the driving member by receiving driving force from the driving member, a driving force transmission member configured to be movably held on the driven member and to be engageable with the driving member, an abutting member configured to be contactable with the driving force transmission member to disengage the driving force transmission member from the driving member, and a biasing member configured to bias the driving force transmission member, wherein, when the driving force transmission member is engaged with the driving member, driving force is transmitted from the driving member to the driven member via the driving force transmission member, and wherein, when the driving force transmission member is disengaged from the driving member, transmission of the driving force from the driving member to the driven member is stopped, wherein the biasing member biases the driving force transmission member in a direction where the driving force transmission member is disengaged from the driving member when the abutting member is in contact with the driving force transmission member engaging with the driving member.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Example 1

A first exemplary embodiment of the present invention will be described. In the present exemplary embodiment, a driving force transmission apparatus included in an electro-photographic image forming apparatus will be described. Before the driving force transmission apparatus is described, first, this image forming apparatus will be described.

Figure 1:
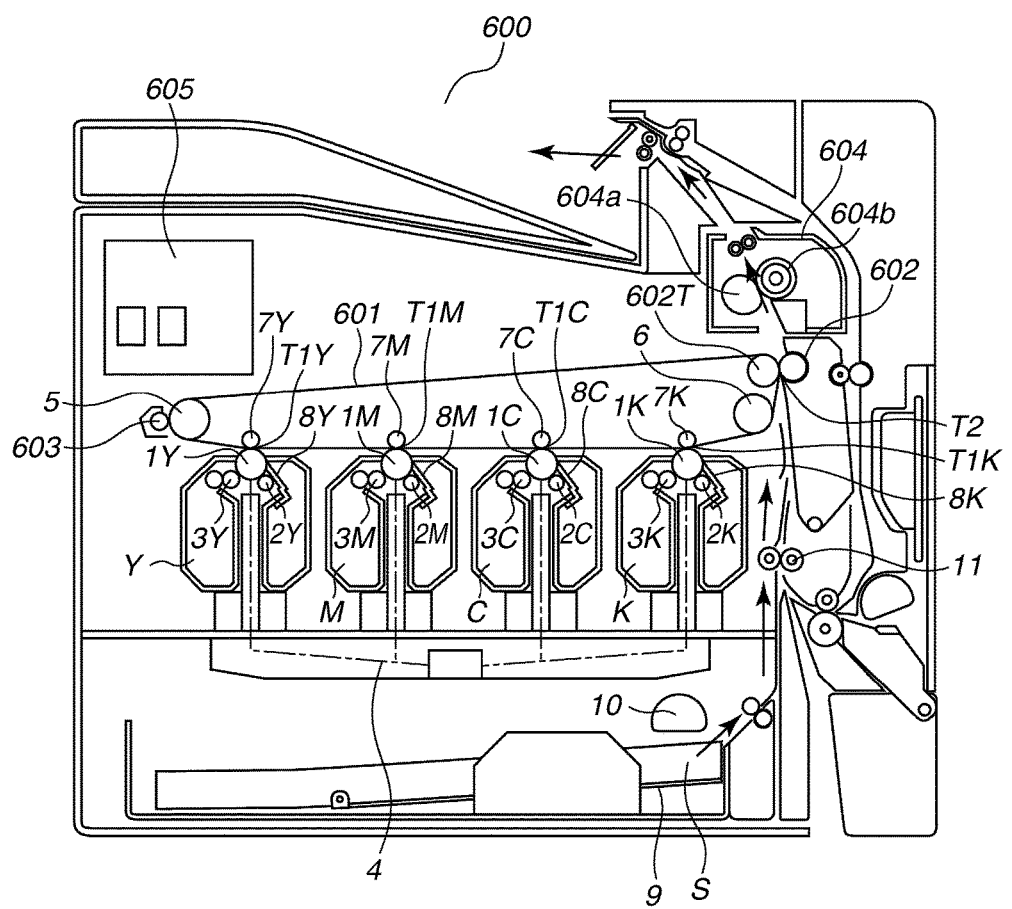
FIG. 1 is a schematic sectional view of an image forming apparatus.

FIG. 1 is a schematic sectional view of the image forming apparatus. This image forming apparatus is a tandem-type electro-photographic color laser printer using an intermediate transfer belt (intermediate transfer member).

An image forming apparatus 600 includes four image forming units Y, M, C, and K forming yellow, magenta, cyan, and black toner images, respectively. These image forming units Y, M, C, and K are arranged to be parallel to each other in the image forming apparatus 600 from left to right in this order.

Each of the image forming units Y, M, C, and K is an image forming unit of the electro-photographic image forming system and forms a toner image of a different color on a photosensitive drum of the image forming unit. Other than that, all the image forming units Y, M, C, and K are configured in the same way. Each of the image forming units Y, M, C, and K includes a photosensitive drum 1 (1Y, 1M, 1C, and 1K).

In addition, as processing units that operate with the photosensitive drum 1, each of the image forming units Y, M, C, and K includes a charging roller 2 (2Y, 2M, 2C, and 2K), a development roller 3 (3Y, 3M, 3C, and 3K), a transfer roller 7 (7Y, 7M, 7C, and 7K), and a cleaning blade 8 (8Y, 8M, 8C, and 8K) around the photosensitive drum 1. In addition, each of the image forming units Y, M, C, and K includes a laser scanner 4 below the photosensitive drum 1. Each laser scanner 4 emits laser light corresponding to image information to the corresponding photosensitive drum 1.

Next, image formation by each of the image forming units Y, M, C, and K will be described. Each photosensitive drum 1 is rotated clockwise in FIG. 1. During this rotation, the photosensitive drum 1 is charged by the charging roller 2 and is illuminated with laser light by the laser scanner 4. As a result, a latent image is formed. By attaching toner attached to the development roller 3 to this latent image, a toner image is formed on the surface of the photosensitive drum 1.

Toner images of yellow, magenta, cyan, and black, which are color-separation component colors of a full-color image, are formed on the surfaces of the photosensitive drums 1Y, 1M, 1C, and 1K of the image forming units Y, M, C, and K, respectively.

In addition, an intermediate transfer belt 601 is arranged above the image forming units Y, M, C, and K. The above toner images are transferred from the respective photosensitive drums 1 to the intermediate transfer belt 601. This intermediate transfer belt 601 is hung and stretched tightly around three rollers arranged in parallel to each other, more specifically, by a support roller 5 arranged near the image forming unit Y, a support roller 6 arranged near the image forming unit K, and a secondary transfer roller 602T arranged above the support roller 6.

The support roller 6 is a roller driving the intermediate transfer belt 601 in the direction of arrow B (counterclockwise) so that the intermediate transfer belt 601 and the photosensitive drum 1 have approximately the same surface speed. The support roller 6 is rotated by a driving source (not illustrated).

Primary transfer rollers 7 facing the photosensitive drums 1 of the image forming units Y, M, C, and K via the intermediate transfer belt 601 are arranged between the support rollers 5 and 6. A primary transfer nip portion T1 is formed between a primary transfer roller 7 and a corresponding photosensitive drum 1. By applying a primary transfer bias to this primary transfer nip portion T1, a toner image on each photosensitive drum 1 is transferred onto the intermediate transfer belt 601.

A secondary transfer roller 602 facing the secondary transfer roller 602T via the intermediate transfer belt 601 is arranged downstream of the primary transfer nip portions T1 in the rotation direction of the intermediate transfer belt 601. The secondary transfer roller 602 presses the secondary transfer roller 602T via the intermediate transfer belt 601, and a secondary transfer nip portion T2 is formed by the intermediate transfer belt 601 and the secondary transfer roller 602. A secondary transfer bias is applied to the toner image on the intermediate transfer belt 601 at the secondary transfer nip portion T2, and the image is transferred onto the sheet conveyed to the secondary transfer nip portion T2.

An intermediate transfer belt cleaner 603 is arranged to face the support roller 5 located downstream of the secondary transfer nip T2 in the rotation direction of the intermediate transfer belt 601. The intermediate transfer belt cleaner 603 brings a cleaning blade into contact with the outer surface of the intermediate transfer belt 601 to scrape remaining toner that is not transferred onto the sheet at the secondary transfer nip portion T2.

A fixing unit 604 includes a pair of pressing rollers. More specifically, the fixing unit 604 includes a fixing roller (heating roller) 604a and a pressure roller 604b.

Next, a process for forming a four-color toner image on a sheet S will be described. A control board 605 functions as a control unit for controlling the image forming apparatus 600, and controls an image forming operation of the image forming apparatus 600. Based on a print start signal, the control board 605 forms yellow, magenta, cyan, and black toner images on the photosensitive drums 1 of the image forming units Y, M, C, and K, respectively.

The toner images are sequentially transferred and superposed onto the intermediate transfer belt 601 at the respective primary transfer nip portions T1. After a four-color toner image is formed on the intermediate transfer belt 601, the four-color toner image is moved to the secondary transfer nip portion T2.

Meanwhile, one of the sheets (recording materials) S stacked and stored in a sheet feed cassette 9 is separately fed by rotation of a feeding roller 10, and the sheet S is conveyed to a registration roller pair 11.

The registration roller pair 11 guides the sheet S to the secondary transfer nip portion T2 when the four-color toner image on the intermediate transfer belt 601 reaches the secondary transfer nip portion T2. Next, the four-color toner image on the intermediate transfer belt 601 is transferred onto the sheet S by the secondary transfer bias. Passing through the secondary transfer nip portion T2, the sheet S is conveyed to the fixing unit 604, at which the unfixed toner image is fixed onto the sheet S by being heated and pressed. In this way, the four-color toner image is formed on the sheet S.

When the image forming apparatus 600 forms a monochrome image (monochrome printing), the photosensitive drums 1Y, 1M, and 1C of the image forming units Y, M, and C could be worn down by being scraped on the intermediate transfer belt 601. To prevent this, the image forming apparatus 600 includes a movement mechanism of primary transfer roller (not illustrated) for bringing the primary transfer rollers 7Y, 7M, and 7C into contact with or away from the intermediate transfer belt 601.

This movement mechanism includes a cam, and by changing the rotation phase of the cam, the primary transfer rollers 7 can be brought into contact with or away from the intermediate transfer belt 601. The driving force transmission apparatus according to the present exemplary embodiment intermittently transmits driving force to the cam of the movement mechanism and is used as part of the gear train rotating the cam at a predetermined timing by a predetermined angle.

Figure 2:
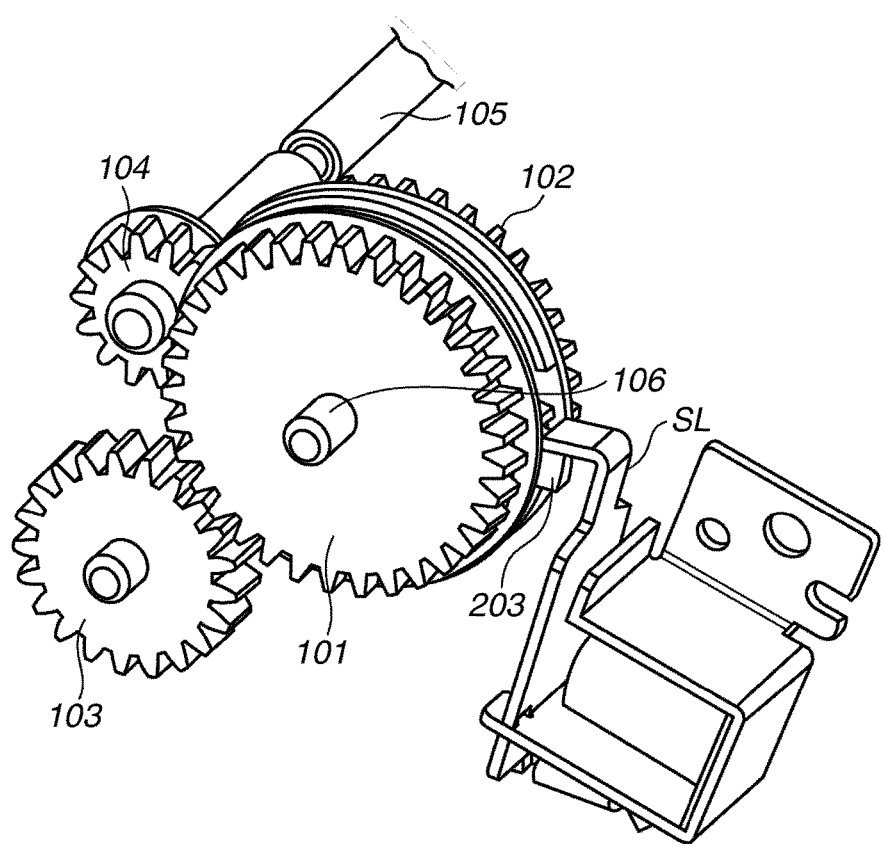
FIG. 2 is a perspective view of a driving force transmission apparatus.

FIG. 2 is a perspective view of the driving force transmission apparatus according to the present exemplary embodiment. This driving force transmission apparatus includes an input gear (driving member) 101, an output gear (driven member) 102, and a solenoid SL. The input gear 101 is connected to and driven by a motor (driving source) (not illustrated) via a gear 103, and is rotated by driving force from the motor. The output gear 102 is connected to and driven by the gear train driving the cam of the above movement mechanism (not illustrated) via a gear 104 and a drive output shaft 105.

Both the input gear 101 and the output gear 102 rotate concentrically around a rotation center 106. A driving force transmission claw and a driving force transmission lever are arranged between the input gear 101 and the output gear 102. Next, a positional relationship of the above components will be described.

Figure 3A:
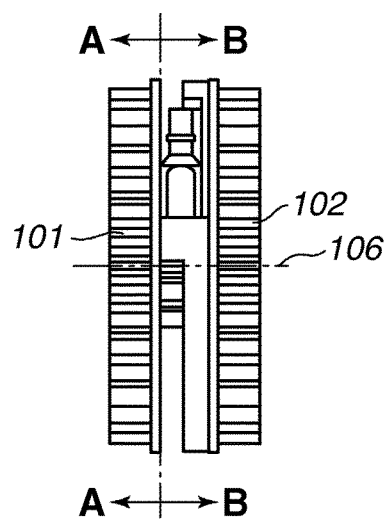
FIG. 3A is a side view of the driving force transmission apparatus, seen in a direction perpendicular to the axis of a rotation center.
Figure 3B:
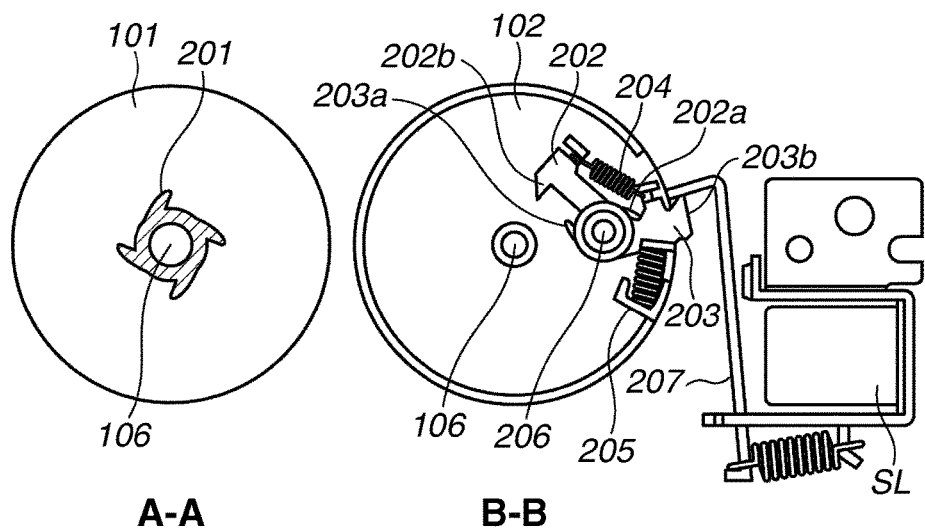
FIG. 3B illustrates an input gear and an output gear divided at positions A-A and B-B in FIG. 3A, seen from the inside of the driving force transmission apparatus.

FIG. 3A is a side view of the driving force transmission apparatus, seen in a direction perpendicular to the axis of the rotation center (rotation shaft) 106. FIG. 3B illustrates the input gear 101 and the output gear 102 divided at positions A-A and B-B in FIG. 3A. The input gear 101 and the output gear 102 are arranged side by side and seen from the inside of the driving force transmission apparatus. That is, in FIG. 3B, the A-A side (left-side) view illustrates the input gear 101 and the B-B side (right-side) view illustrates the output gear 102. The solenoid SL is illustrated in the right-side view.

A driving force transmission claw 201 is integrally formed on the input gear 101 around the rotation shaft. A first driving force transmission lever 202 and a second driving force transmission lever 203 are held on a side surface of the output gear 102. These two levers form the driving force transmission member serving as an engaging member that engages with the driving force transmission claw 201. These first and second driving force transmission levers 202 and 203 are rotatable around a shaft 206, which is different from the rotation center 106 of the output gear 102.

The first driving force transmission lever 202 includes an engaging portion 202b having a shape that can engage with the driving force transmission claw 201, and the second driving force transmission lever 203 includes a locked portion (abutted portion) 203b having a shape that can come into contact with and be locked by a flapper (abutting member) 207.

The first driving force transmission lever 202 includes a stopper 202a that can come into contact with the second driving force transmission lever 203 and that can prevent the first driving force transmission lever 202 from coming close to the second driving force transmission lever 203. In other words, the stopper 202a prevents the engaging portion 202b from coming close to the locked portion 203b.

Similarly, the second driving force transmission lever 203 includes a stopper 203a that can come into contact with the first driving force transmission lever 202 and that can prevent the first driving force transmission lever 202 from moving away from the second driving force transmission lever 203 more than a predetermined amount. In other words, the stopper 203a prevents the engaging portion 202b from moving away from the locked portion 203b.

These two stoppers 202a and 203a function as a regulating portion determining the range of movement of the first driving force transmission lever 202 with respect to the second driving force transmission lever 203. In other words, the first driving force transmission lever 202 is controlled to rotate within a predetermined angle with respect to the second driving force transmission lever 203.

In addition, a spring 204 for biasing the first and second driving force transmission levers 202 and 203 to be closer to each other is arranged between the first and second driving force transmission levers 202 and 203. In other words, the spring 204 biases the first driving force transmission lever 202 to be separated away from the rotation center 106 and the driving force transmission claw 201. In addition, a spring 205 for biasing the second driving force transmission lever 203 to rotate counterclockwise around the shaft 206 is arranged between the output gear 102 and the second driving force transmission lever 203.

Next, an intermittent drive operation of the output gear 102 using the driving force transmission apparatus according to the present exemplary embodiment will be described. FIGS. 4A to 6 illustrate the driving force transmission apparatus, seen in the axis direction of the rotation center 106 from the input gear 101 side to the output gear 102 side. In FIGS. 4A to 6, for simplicity, the exterior of a diagonally upper half portion of the input gear 101 is hidden.

Figure 4A:
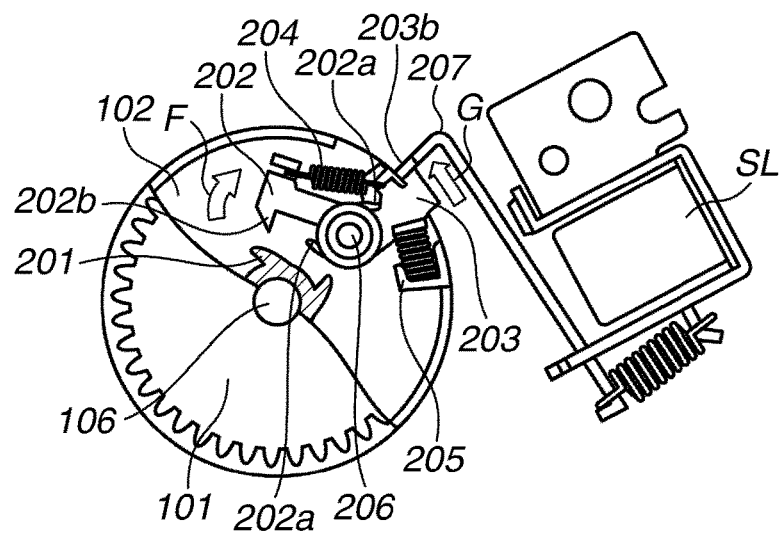
FIG. 4A illustrates the driving force transmission apparatus seen in the axis direction of the rotation center from the input gear side to the output gear side.

FIG. 4A illustrates a standby state in which no driving force is transmitted from the input gear 101 to the output gear 102. In this state, since no current flows through the solenoid SL, the flapper 207 locks the second driving force transmission lever 203. The first driving force transmission lever 202 is at a disengagement position where the first driving force transmission lever 202 is disengaged from the driving force transmission claw 201, and no driving force is transmitted from the input gear 101 to the output gear 102.

In addition, since the first and second driving force transmission levers 202 and 203 attract each other by the spring 204, the first driving force transmission lever 202 is biased in the direction of arrow F. The stopper 202a is in contact with the second driving force transmission lever 203. In addition, the second driving force transmission lever 203 is biased in the direction of arrow G by the spring 205.

The position of the second driving force transmission lever 203 is determined when the locked portion 203b of the second driving force transmission lever 203 comes into contact with the flapper 207. Load by the cam or link mechanism (not illustrated) arranged downstream in the driving force transmission direction is applied to the output gear 102, and this load serves as rotational resistance for rotation of the output gear 102. Thus, by setting the spring pressure of the spring 205 to be smaller than the rotational resistance, the output gear 102 is prevented from being rotated clockwise in the figure by the force of the spring 205.

Next, when a current flows through the solenoid SL, the flapper 207 moves to a retracted position and unlocks the second driving force transmission lever 203. Accordingly, the spring 205 presses and rotates the second driving force transmission lever 203 in the direction of arrow H. In this state, since the second driving force transmission lever 203 is in contact with the stopper 202a, the first driving force transmission lever 202 also rotates in the direction of arrow H via the stopper 202a.

Figure 4B:
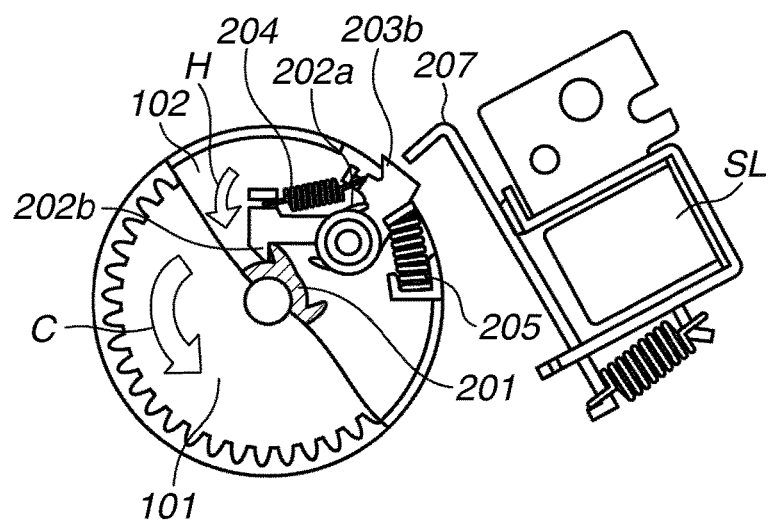
FIG. 4B illustrates the driving force transmission apparatus seen in the axis direction of the rotation center from the input gear side to the output gear side.

Accordingly, the first driving force transmission lever 202 moves to an engagement position, and the locked portion 202b engages with the driving force transmission claw 201. As illustrated in FIG. 4B, this engagement couples the input gear 101 and the output gear 102 via the first and second driving force transmission levers 202 and 203. As a result, since the input gear 101 and the output gear 102 start to rotate integrally in the direction of arrow C, driving force is transmitted from the output gear 102 to the gears located downstream in the driving force transmission direction.

During rotation of the output gear 102, if supply of the current flowing through the solenoid SL is stopped, the flapper 207 returns to a locking position where the flapper 207 can lock the locked portion 203b of the second driving force transmission lever 203.

Figure 5A:
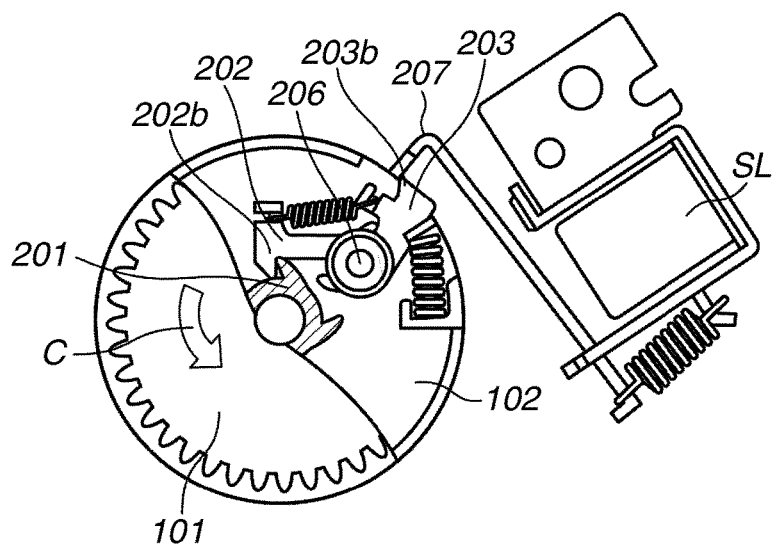
FIG. 5A illustrates the driving force transmission apparatus seen in the axis direction of the rotation center from the input gear side to the output gear side.

When the output gear 102 rotates one revolution by receiving the driving force from the input gear 101, the locked portion 203b of the second driving force transmission lever 203 comes into contact with the flapper 207 at the locking position, as illustrated in FIG. 5A. In this state, the engaging portion 202b of the first driving force transmission lever is still engaged with the driving force transmission claw 201 and the input gear 101 still transmits the driving force to the output gear 102.

Thus, while the flapper 207 locks the locked portion 203b of the second driving force transmission lever 203, the output gear 102 and the first driving force transmission lever 202 still receives the force to rotate in the direction of arrow C.

Accordingly, while the flapper 207 locks the locked portion 203b of the second driving force transmission lever 203, the output gear 102 and the first driving force transmission lever 202 rotate in the direction of arrow C. In this state, the engaging portion 202b of the first driving force transmission lever 202 is pulled by the driving force transmission claw 201, and the second driving force transmission lever 203 is pulled by the shaft 206 integrally formed on the output gear 102, while the locked portion 203b is locked by the flapper 207.

As a result, as the first and second driving force transmission levers 202 and 203 are moved to be separated away from each other against the elastic force of the spring 204, the angle between the first and second driving force transmission levers 202 and 203 is increased.

Figure 5B:
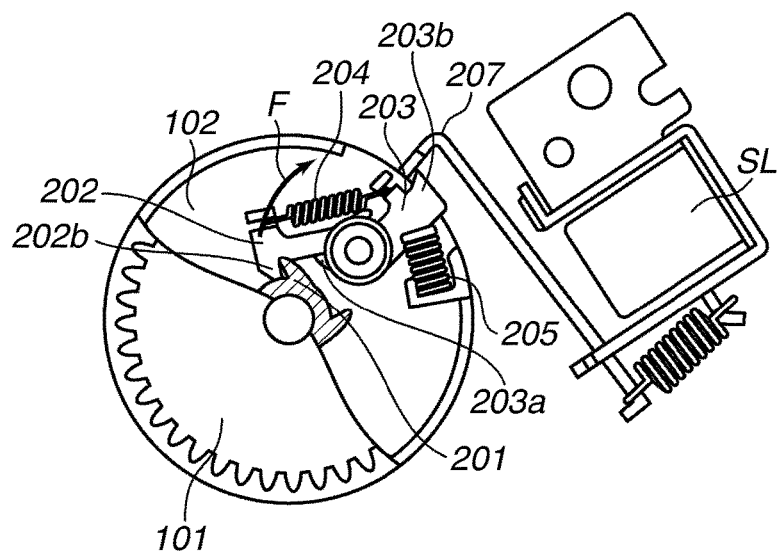
FIG. 5B illustrates the driving force transmission apparatus seen in the axis direction of the rotation center from the input gear side to the output gear side.

When the angle between the first and second driving force transmission levers 202 and 203 is increased to a predetermined angle, as illustrated in FIG. 5B, the stopper 203a comes into contact with the first driving force transmission lever 202. This is the maximum angle between the first and second driving force transmission levers 202 and 203.

In addition, since the first and second driving force transmission levers 202 and 203 are moved to be separated away from each other against the force (elastic force) of the spring 204, the lever 202 is pulled in the direction of arrow F by the force of the spring 204.

Figure 6:
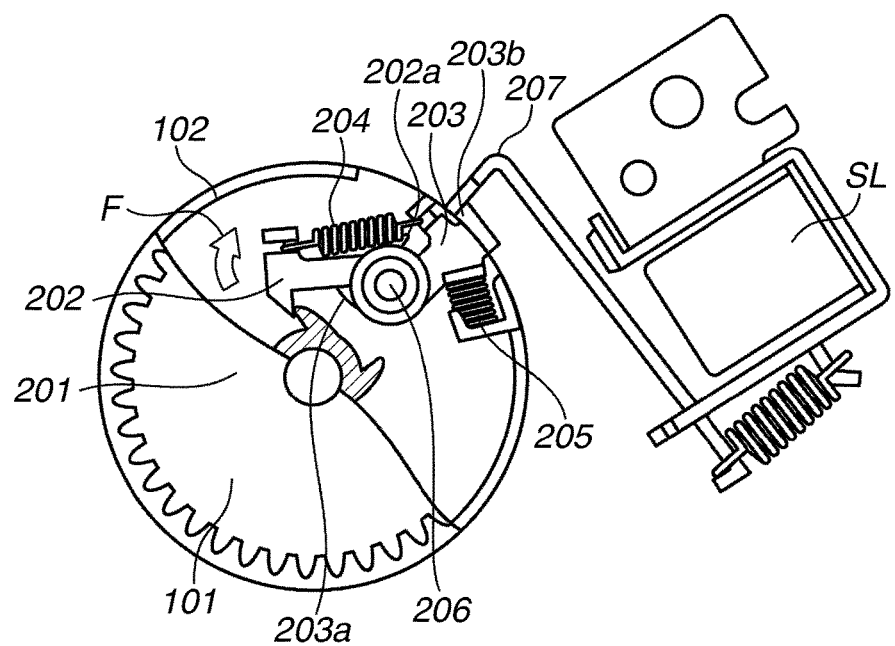
FIG. 6 illustrates the driving force transmission apparatus seen in the axis direction of the rotation center from the input gear side to the output gear side.

Next, the driving force transmission claw 201 is rotated further, as illustrated in FIG. 6. In this state, while the output gear 102 is rotated as long as the locked portion 202b is engaged with the driving force transmission claw 201, since the flapper 207 is locking the locked portion 203b, the first and second driving force transmission levers 202 and 203 at the maximum angle are integrally rotated in the direction of arrow F around the shaft 206.

Thus, the engaging portion 202b of the first driving force transmission lever 202 slides in the direction of arrow F (upwards) from the driving force transmission claw 201 while being in contact with the driving force transmission claw 201.

In this state, as described above, since the first and second driving force transmission levers 202 and 203 are at the maximum angle, the first driving force transmission lever 202 is pulled by the spring 204 in the direction of arrow F.

Thus, when the frictional force between the driving force transmission claw 201 and the engaging portion 202b of the first driving force transmission lever 202 decreases below the force of the spring 204 pulling the first driving force transmission lever 202 in the direction of arrow F, the first driving force transmission lever 202 is rotated in the direction of arrow F by the force of the spring 204. Accordingly, the first driving force transmission lever 202 is moved closer to the second driving force transmission lever 203, and the angle between the first and second driving force transmission levers 202 and 203 is decreased. As a result, the engaging portion 202b is disengaged from the driving force transmission claw 201.

The first driving force transmission lever 202 is rotated until the force of the spring 204 causes the stopper 202a to come into contact with the second driving force transmission lever 203. In this way, the driving force transmission apparatus returns to the standby state in which the engaging portion 202b is sufficiently retracted from the driving force transmission claw 201 as illustrated in FIG. 4A. In the standby state, since the driving force from the input gear 101 is not transmitted to the output gear 102, even if the input gear 101 continuously rotates, the output gear 102 is stopped.

In addition, the output gear 102 is continuously rotated by the driving force from the driving force transmission claw 201 from when the second driving force transmission lever 203 comes into contact with the flapper 207 to when the first driving force transmission lever 202 is disengaged from the driving force transmission claw 201. During this rotation, the locked portion 203b is locked by the flapper 207, and the second driving force transmission lever 203 pulled by the shaft 206 rotates while compressing the spring 205.

Thus, if the flapper 207 unlocks the second driving force transmission lever 203, as described above, the spring 205 is released, and the spring 205 can press and rotate the second driving force transmission lever 203.

As described above, in the present exemplary embodiment, the first driving force transmission lever 202 engaging with the driving force transmission claw 201 and the second driving force transmission lever 203 locked by the flapper 207 are used as the engaging member engaging the input gear 101 with the output gear 102. In addition, the first driving force transmission lever 202 is configured to be movable with respect to the second driving force transmission lever 203 and the first driving force transmission lever 202 is configured to be pulled by the spring 204 toward the second driving force transmission lever 203.

Thus, after the first driving force transmission lever 202 is disengaged from the driving force transmission claw 201, the first driving force transmission lever 202 can move toward the second driving force transmission lever 203 by the force of the spring 204. Accordingly, the first driving force transmission lever 202 can move away from the driving force transmission claw 201.

As a result, the first driving force transmission lever 202 can be retracted to a position sufficiently away from the driving force transmission claw 201 without fail. By causing the first driving force transmission lever 202 to retract from the driving force transmission claw 201 without fail, transmission of the driving force can be stopped without fail and mechanical defects such as generation of a collision noise can be eliminated.

Figure 7A:
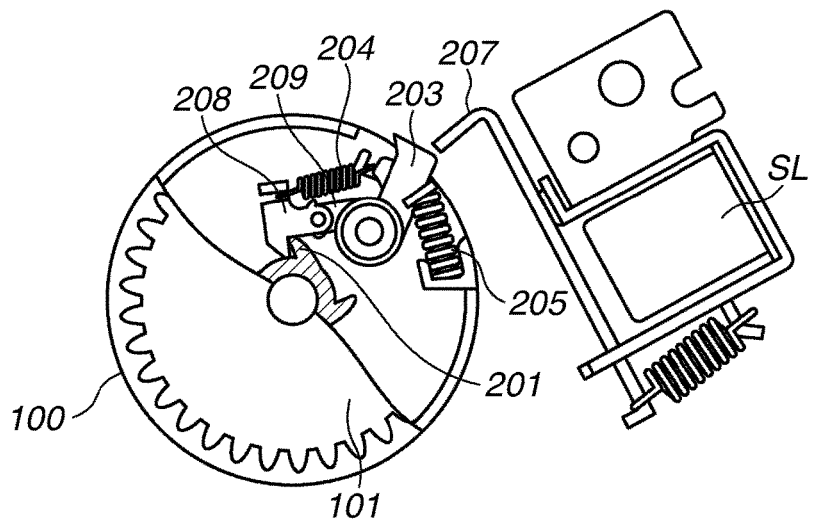
FIG. 7A illustrates another configuration of the driving force transmission apparatus.
Figure 7B:
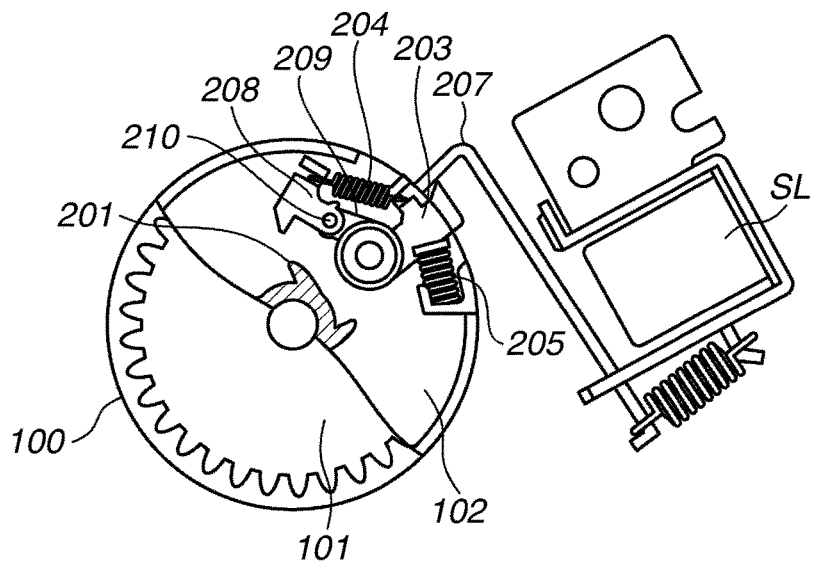
FIG. 7B illustrates another configuration of the driving force transmission apparatus.

As another configuration of the present exemplary embodiment, as illustrated in FIGS. 7A and 7B, the first driving force transmission lever 202 can be formed as two first driving force transmission levers 208 and 209. In this case, a drive lever fulcrum 210 rotatably couples the first driving force transmission levers 208 and 209, and the spring 204 is arranged between the first and second driving force transmission levers 208 and 203. Even configured in this way, the first driving force transmission lever 208 can sufficiently be retracted from the driving force transmission claw 201 in a similar way to that with the above configuration.

Alternatively, the second driving force transmission lever 203 may be formed by two components. Still alternatively, the first or second driving force transmission lever may be divided into three or more components.

Thus, it is only necessary to include a locked portion that is held by the output gear and that is locked by the flapper and an engaging portion that engages with the driving force transmission claw, and to configure the engaging portion to be movable with respect to the locked portion and pulled away from the driving force transmission claw when the locked portion is locked by the flapper. With this configuration, when the engaging portion is disengaged from the driving force transmission claw, the engaging portion is retracted away from the driving force transmission claw. Thus, advantageous effects of the present exemplary embodiment can be obtained.

Example 2

Next, a second exemplary embodiment will be described. In the first exemplary embodiment, the spring 204 is arranged between the first and second driving force transmission levers 202 and 203. However, in the second exemplary embodiment, the spring 204 is arranged between the first driving force transmission lever 202 and the output gear 102, and the engaging portion 202b of the first driving force transmission lever 202 is pulled to be separated from the driving force transmission claw 201.

In the second exemplary embodiment, the components similar to those in the first exemplary embodiment are denoted by the same reference numerals and characters, and redundant description thereof will be avoided.

Figure 8A:
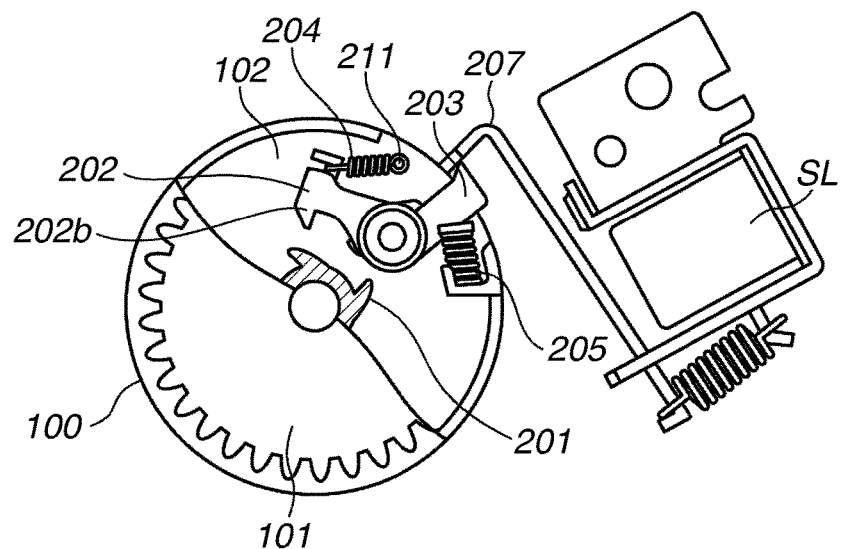
FIG. 8A illustrates a driving force transmission apparatus seen in the axis direction of a rotation center from the input gear side to the output gear side.

FIG. 8A illustrates a standby state in which no driving force is transmitted from the input gear 101 to the output gear 102. If the spring 204 is arranged between the first driving force transmission lever 202 and the output gear 102, the spring force of the spring 205 is set to be larger than that of the spring 204 so that the first driving force transmission lever 202 can engage with the driving force transmission claw 201 when the flapper 207 unlocks the locked portion 203b.

In this way, after the flapper 207 unlocks the locked portion 203b, the second driving force transmission lever 203 pressed by the spring 205 can press the first driving force transmission lever 202 via the stopper 202a, rotate the first driving force transmission lever 202 against the force of the spring 204, and engage the engaging portion 202b with the driving force transmission claw 201.

Figure 8B:
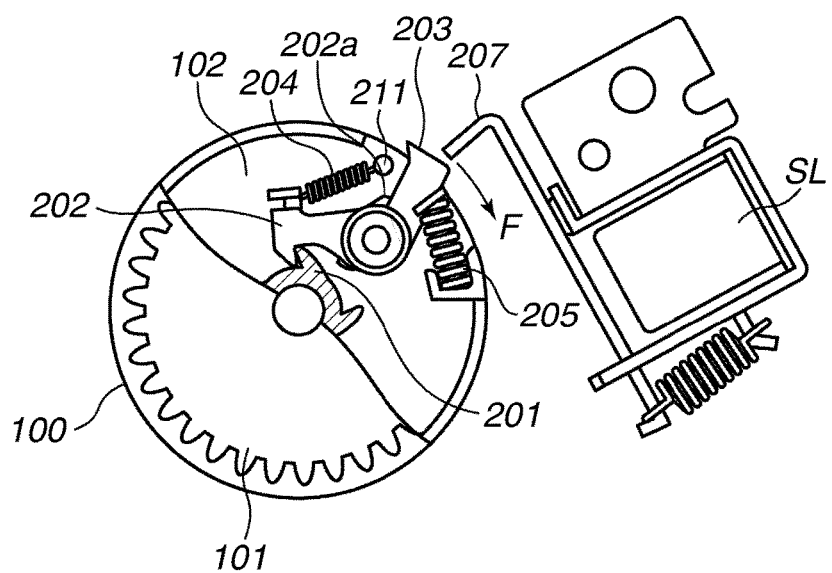
FIG. 8B illustrates a driving force transmission apparatus seen in the axis direction of a rotation center from the input gear side to the output gear side.

Thus, when the first driving force transmission lever 202 engages with the driving force transmission claw 201, as illustrated in FIG. 8B, the spring 204 is stretched by the force of the spring 205. The input gear 101 and the output gear 102 couple and rotate, with the spring 204 being stretched in this way.

Subsequently, the flapper 207 comes into contact with the second driving force transmission lever 203. However, since the first driving force transmission lever 202 is still engaged with the driving force transmission claw 201, the output gear 102 is still rotated. Thus, the second driving force transmission lever 203 rotates in the direction of arrow F.

Simultaneously, the force of the spring 204 being stretched rotates the first driving force transmission lever 202 in the direction of arrow F. As a result, the first driving force transmission lever 202 is disengaged from the driving force transmission claw 201. The moment when the first driving force transmission lever 202 is disengaged from the driving force transmission claw 201, the spring 204 is still stretched. Thus, the first driving force transmission lever 202 further moves in the direction of arrow F (away from the driving force transmission claw 201) by the force of the spring 204.

In this way, even if the spring 204 is arranged between the first driving force transmission lever 202 and the output gear 202, when the first driving force transmission lever 202 is disengaged from the driving force transmission claw 201, the force of the spring 204 moves the first driving force transmission lever 202 away from the driving force transmission claw 201. Accordingly, the first driving force transmission lever 202 can be retracted to a position sufficiently away from the driving force transmission claw 201 without fail.

Thus, advantageous effects similar to those according to the first exemplary embodiment can be obtained. Since the first driving force transmission lever 202 can be retracted from the driving force transmission claw 201 without fail, transmission of the driving force can be stopped without fail and mechanical defects such as generation of a collision noise can be eliminated.

Example 3

Next, a third exemplary embodiment will be described. The third exemplary embodiment is different from the first and second exemplary embodiments in that a driving force transmission claw 804 is an internally-toothed gear having convex portions toward the rotation center 106 of an input gear 801. The third exemplary embodiment will be described based on a configuration including the first and second driving force transmission levers as in the first exemplary embodiment. Thus, the components similar to those in the first exemplary embodiment are denoted by the same reference numerals and characters, and redundant description thereof will be avoided.

Figure 9A:
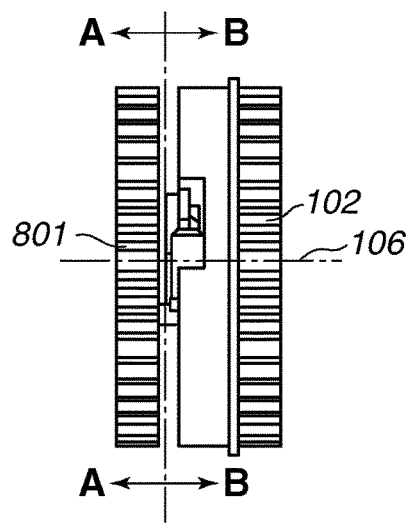
FIG. 9A is a side view of a driving force transmission apparatus seen in a direction perpendicular to the axis of a rotation center.
Figure 9B:
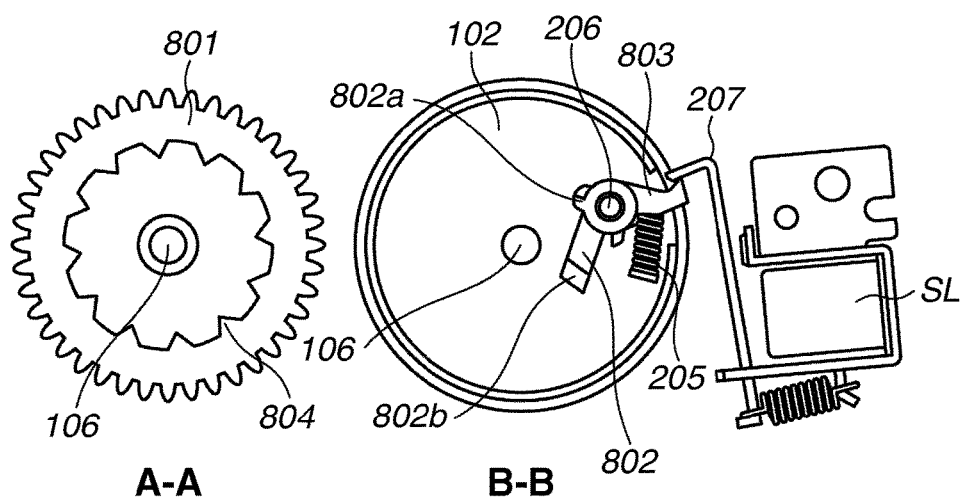
FIG. 9B illustrates an input gear and an output gear divided at positions A-A and B-B in FIG. 9A, the input gear and the output gear being arranged side by side and seen from the inside of the driving force transmission apparatus.

FIG. 9A is a side view of a driving force transmission apparatus, seen in a direction perpendicular to the axis of the rotation center (rotation shaft) 106. FIG. 9B illustrates the input gear 801 and the output gear 102 divided at positions A-A and B-B in FIG. 9A. The input gear 801 and the output gear 102 are arranged side by side and seen from the inside of the driving force transmission apparatus. That is, in FIG. 9B, the A-A side (left-side) view illustrates the input gear 801 and the B-B side (right-side) view illustrates the output gear 102. The solenoid SL is illustrated in the right-side view.

On the inner side of the input gear 801, there is arranged the driving force transmission claw 804 that rotates around the shaft 106 concentrically with the input gear 801 and that has the claw tips pointing toward the rotation center shaft 106. The output gear 102 holds integrally-formed first and second driving force transmission levers 802 and 803 at a position different from the rotation center shaft 106 of the output gear 102. These levers 802 and 803 can swing around the lever shaft 206 as the rotation center.

The first driving force transmission lever 802 includes a stopper 802a that comes into contact with the second driving force transmission lever 803 and an engaging portion 802b that engages with the driving force transmission claw 804. In addition, the second driving force transmission lever 803 includes a stopper 803a that comes into contact with the first driving force transmission lever 802 and a locked portion 803b that is locked by the flapper 207.

In addition, a spring 805 (see FIG. 10) that separates the first and second driving force transmission levers 802 and 803 is arranged between the levers 802 and 803. That is, the first driving force transmission lever 802 is biased by the torsion coil spring 805 to be separated away from the rotation center 106 and the driving force transmission claw 802. In addition, the spring 205 is arranged between the output gear 102 and the second driving force transmission lever 803. This spring 205 pushes and rotates the second driving force transmission lever 803 counterclockwise around the shaft 206.

Figure 10A:
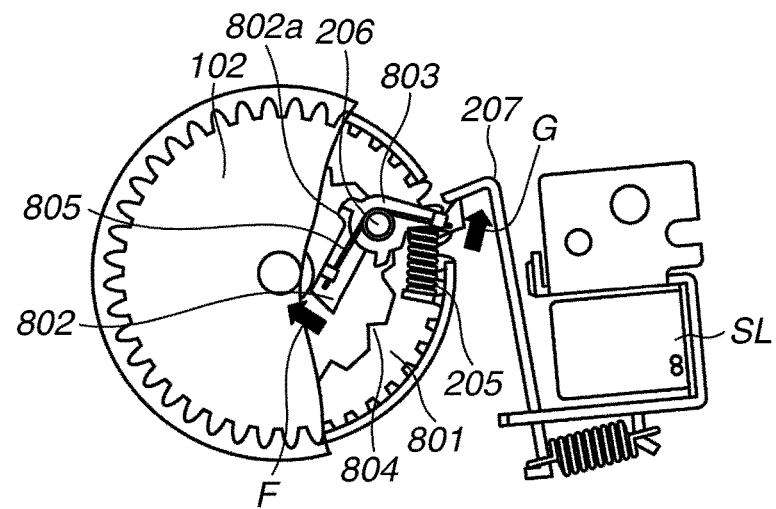
FIG. 10A illustrates the driving force transmission apparatus seen in the axis direction of the rotation center from the input gear side to the output gear side.
Figure 10B:
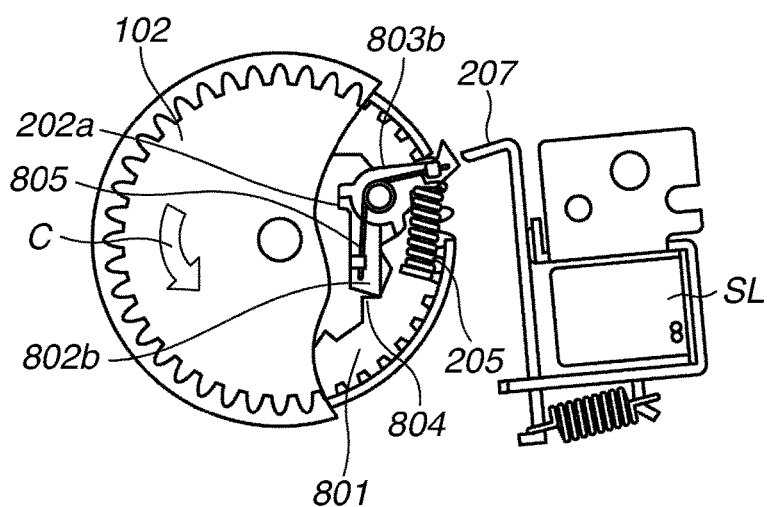
FIG. 10B illustrates the driving force transmission apparatus seen in the axis direction of the rotation center from the input gear side to the output gear side.
Figure 11:
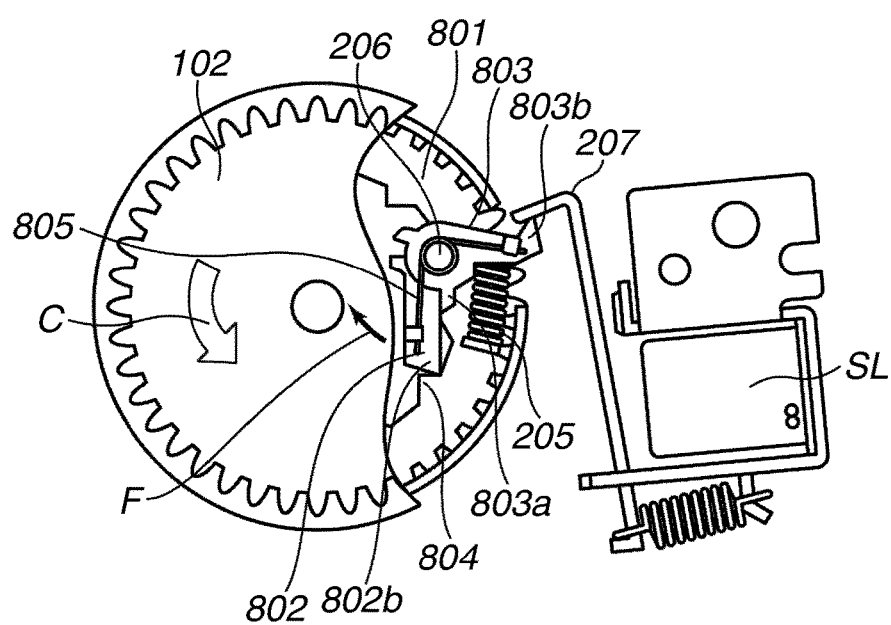
FIG. 11 illustrates the driving force transmission apparatus seen in the axis direction of the rotation center from the input gear side to the output gear side.

Next, an intermittent drive operation of the output gear 102 using this driving force transmission apparatus will be described with reference FIGS. 10A to 11, which illustrate the driving force transmission apparatus, seen in the axis direction of the rotation center 106 from the input gear 101 side to the output gear 102 side. In FIGS. 10A to 11, for simplicity, the exterior of a diagonally upper half portion of the input gear 801 is hidden.

FIG. 10A illustrates a standby state in which no driving force is transmitted from the input gear 801 to the output gear 102. In this state, since no current flows through the solenoid SL, the flapper 207 locks the second driving force transmission lever 203. In addition, in this state, since the spring 805 biases the first driving force transmission lever 802 in the direction of arrow F, the first driving force transmission lever 802 is sufficiently retracted from the driving force transmission claw 804.

The stopper 802a is in contact with the second driving force transmission lever 803. In addition, the second driving force transmission lever 803 is biased by the spring 205 in the direction of arrow G.

Next, when a current flows through the solenoid SL, the flapper 207 moves to a retracted position, and unlocks the second driving force transmission lever 803. Accordingly, as illustrated in FIG. 10B, the second driving force transmission lever 803 is rotated around the shaft 206 by the spring 205.

Simultaneously, the second driving force transmission lever 803 presses and rotates the first driving force transmission lever 802 via the stopper 202a. As a result, the engaging portion 802b of the first driving force transmission lever 802 engages with the driving force transmission claw 804, and the input gear 801 and the output gear 102 couple to each other via the first and second driving force transmission levers 802 and 803, and start to integrally rotate in the direction of arrow C.

During rotation of the output gear 102, if supply of the current flowing through the solenoid SL is stopped, the flapper 207 returns to a locking position at which the flapper 207 can lock the locked portion 803b of the second driving force transmission lever 803.

When the output gear 102 rotates one revolution by receiving the driving force from the input gear 801, the locked portion 803b of the second driving force transmission lever 803 comes into contact with the flapper 207, as illustrated in FIG. 11. In this state, the engaging portion 802b of the first driving force transmission lever 803 is still engaged with the driving force transmission claw 804. Thus, while the locked portion 803b is locked by the flapper 207, the output gear 102 and the first driving force transmission lever 802 are rotated in the direction of arrow C.

In this state, the engaging portion 802b is pulled by the driving force transmission claw 804, and the second driving force transmission lever 803 is pulled by the shaft 206 integrally formed on the output gear 102, while the locked portion 803b is locked by the flapper 207. As a result, as the first and second driving force transmission levers 802 and 803 are rotated to come close to each other against the spring force of the torsion coil spring 805, the angle between the first and second driving force transmission levers 802 and 803 is decreased.

Consequently, when the first driving force transmission lever 802 comes into contact with the stopper 803a, the first and second driving force transmission levers 802 and 803 are closed to a minimum angle.

If the driving force transmission claw 804 is further rotated, the output gear 102 is also rotated. Accordingly, the first and second driving force transmission levers 802 and 803 are integrally rotated around the shaft 206 in the direction of arrow F. As a result, the engaging portion 802*b* of the first driving force transmission lever 802 slides upward from the driving force transmission claw 804 while being into contact with the driving force transmission claw 804.

In this state, since the first driving force transmission lever 802 is pulled by the torsion coil spring 805 in the direction of arrow F. Thus, when the frictional force between the driving force transmission claw 804 and the engaging portion 802*b* decreases below the force of the torsion coil spring 805 pulling the first driving force transmission lever 802 or when the driving force transmission claw 804 and the engaging portion 802*b* are separated, the first driving force transmission lever 802 is rotated in the direction of arrow F by the force of the torsion coil spring 805.

As a result, the angle between the first and second driving force transmission levers 802 and 803 is increased, and the first driving force transmission lever 802 is retracted from the driving force transmission claw 804. The first driving force transmission lever 802 is rotated until the force of the torsion coil spring 805 causes the stopper 802*a* to come into contact with the second driving force transmission lever 803. In this way, the driving force transmission apparatus returns to the standby state in which the engaging portion 802*b* is sufficiently retracted from the driving force transmission claw 804 as illustrated in FIG. 10A.

Thus, in the present exemplary embodiment, when the first driving force transmission lever 802 is disengaged from the driving force transmission claw 804, the spring 805 moves the first driving force transmission lever 802 away from the driving force transmission claw 804.

Therefore, the first driving force transmission lever 802 can be retracted to a position sufficiently away from the driving force transmission claw 804 without fail. Since the first driving force transmission lever 802 can be retracted from the driving force transmission claw 804 without fail, transmission of the driving force can be stopped without fail and mechanical defects such as generation of a collision noise can be eliminated. Thus, advantageous effects similar to those according to the first exemplary embodiment can be obtained.

In addition, since the driving force transmission claw 804 having an internally-toothed shape is arranged on the input gear 801, the driving force transmission claw 804 can have more claw portions than the driving force transmission claw 201 having an externally-toothed shape according to the first exemplary embodiment.

In this way, the time between when a current flows through the solenoid SL and when the first driving force transmission lever 802 engages with the driving force transmission claw 804 can be shortened. Thus, the switching response from a state in which no driving force is transmitted to a state in which driving force is transmitted can be improved.

In addition, if the input gear has the same diameter, an internally-toothed driving force transmission claw can engage with the first driving force transmission lever at a position farther away from the rotation center of the input gear in the radius direction, compared with an externally-toothed driving force transmission claw. Thus, even when the driving force transmission apparatus is subjected to high torque, the driving force can be transmitted.

While the present exemplary embodiment has been described based on the configuration according to the first exemplary embodiment, an internally-toothed driving force transmission claw as described above can be applied to the configuration according to the second exemplary embodiment.

Example 4

Next, a fourth exemplary embodiment will be described. The fourth exemplary embodiment further includes a reverse rotation prevention member for applying load for preventing reverse rotation of the output gear, in addition to the first and second driving force transmission levers as used in the first to third exemplary embodiments. Thus, the fourth exemplary embodiment will be described based on the configuration according to the first exemplary embodiment. Therefore, the components similar to those in the first exemplary embodiment are denoted by the same reference numerals and characters, and redundant description thereof will be avoided.

In each of the above exemplary embodiments, the driving force transmission apparatus according to the present invention is used for the movement mechanism. However, depending on the position where the driving force transmission apparatus according to the present invention is used, force (back tension) that reversely rotates the output gear 102 is transmitted from the driven gear train located downstream of the output gear 102 in the driving force transmission direction to the output gear 102.

In addition, there are cases where the driven gear train has a very small rotational resistance, and it is difficult to set the spring pressure of the spring 205 to be smaller than the rotational resistance of the driven gear train. There are also cases where the driven gear train has large rotational play.

In such cases, when the flapper 207 locks the driving force transmission lever and no driving force is transmitted between the output gear 102 and the input gear, because of the above back tension or play of the driven gear train, the spring 205 could press and reversely rotate the output gear 102 (clockwise in FIG. 4A).

In this case, simultaneously with the reverse rotation of the output gear 102, the force of the spring 205 is released, and the second driving force transmission lever 203 is rotated around the shaft 206. As a result, the engaging portion 202*b* of the first driving force transmission lever 202 may not be maintained at the position sufficiently retracted from the driving force transmission claw 201, and may return to the position where the engaging portion 202*b* comes into contact with the driving force transmission claw 201.

Thus, in the present exemplary embodiment, a configuration for preventing the reverse rotation of the output gear 102 will be described. The components similar to those in the first exemplary embodiment are denoted by the same reference numerals and characters, and redundant description thereof will be avoided.

Figure 12:
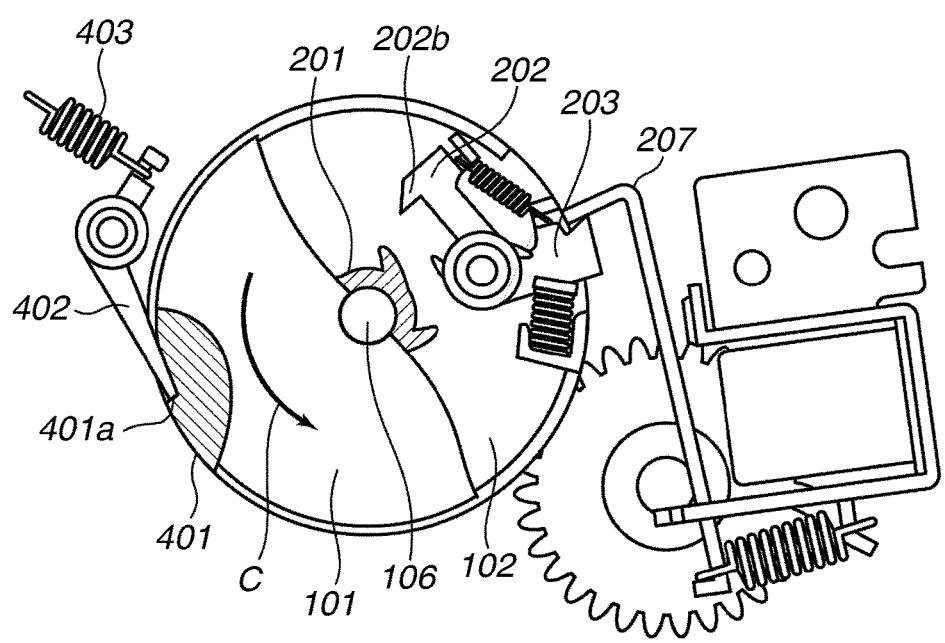
FIG. 12 illustrates a driving force transmission apparatus seen in the axis direction of a rotation center from the input gear side to the output gear side.
Figure 13A:
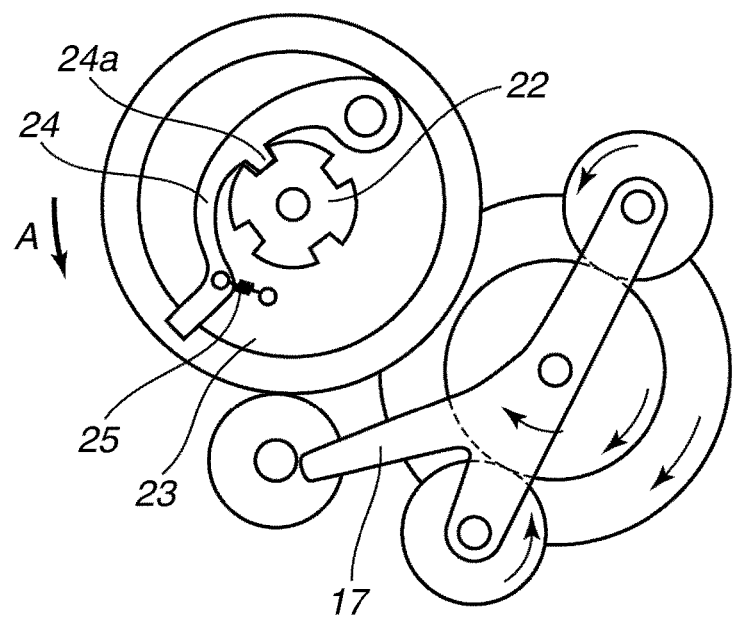
FIG. 13A schematically illustrates a conventional driving force transmission apparatus.
Figure 13B:
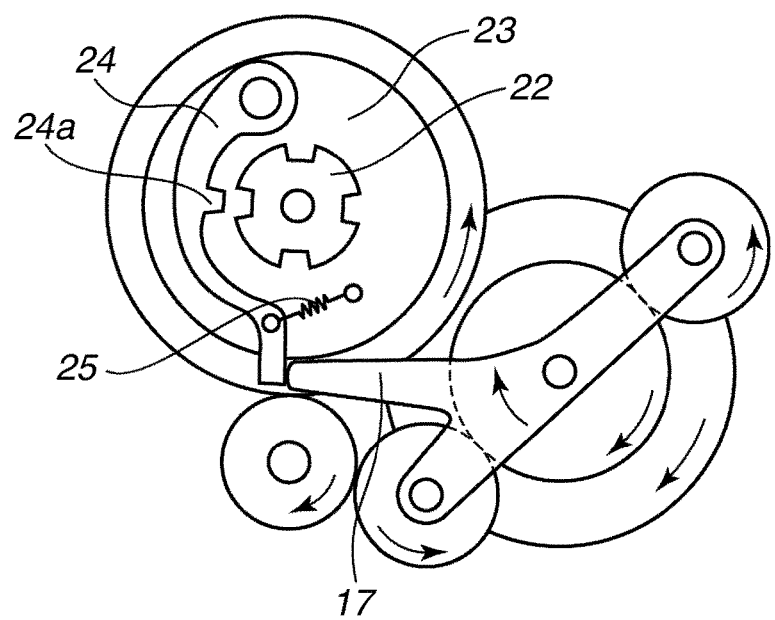
FIG. 13B schematically illustrates a conventional driving force transmission apparatus.

FIG. 12 illustrates a driving force transmission apparatus according to the present exemplary embodiment, seen in the axis direction of the rotation center 106 from the input gear 101 side to the output gear 102 side. In FIG. 12, for simplicity, the exterior of a diagonally upper half portion of the input gear 101 is hidden. In addition, the area around a rotation stop lever 402 is also illustrated in a different sectional view.

In the driving force transmission apparatus according to the present exemplary embodiment, the output gear 102 includes a rotation stop guide surface 401 having level differences 401a that prevent the reverse rotation and the rotation stop lever 402 pressing the guide surface 401 by a rotation stop lever spring 403 and engaging with a difference 401a. The guide surface 401 is displaced from the second driving force transmission lever 203 in the axis direction of the rotation center 106.

The level differences 401a are arranged so that the rotation stop lever 402 passes the level differences 401a before the engaging portion 202b of the first driving force transmission lever 202 is disengaged from the driving force transmission claw 201. In this way, the rotation stop lever 402 functions as a reverse rotation prevention member that engages with a level difference 401a without fail when the output gear 102 reversely rotates (in the direction opposite to the direction C) and that prevents further reverse rotation of the output gear 102.

If this configuration is used, it is only sufficient to provide the rotation stop lever 402 with force enough to engage with a level difference 401a and prevent reverse rotation of the output gear 102. The spring pressure of the rotation stop lever spring 403 is approximately 10 gf*cm.

As described above, even if a reverse rotation prevention member is arranged, if the reverse rotation prevention member is configured as described in the present exemplary embodiment, rotational load applied to the output gear 102 by the reverse rotation prevention member can be set to be relatively small. Therefore, the torque necessary for the driving source to drive the input gear 101 can be maintained to be small.

Alternatively, another reverse rotation prevention member may be used. For example, a pad member may be brought into contact with a side surface of the output gear 102 to increase the rotational resistance of the output gear 102. For example, a one-way clutch may be arranged in the driven gear train located downstream of the output gear 102 in the driving force transmission direction. Alternatively, these configurations may be combined and used as a reverse rotation prevention member. In these cases, the rotational load applied to the output gear 102 can be set to be relatively small and the torque necessary for the driving source to drive the input gear 101 can be maintained to be small.

As described above, the fourth exemplary embodiment can provide advantageous effects similar to those in the first to third exemplary embodiments. In addition, since the reverse rotation prevention member is arranged, the reverse rotation of the output gear can be prevented. In addition, the fourth exemplary embodiment includes a locked portion that is held by the output gear 102 and that is locked by the flapper 207 and an engaging portion that engages with the driving force transmission claw 201 and the engaging portion is configured to be movable with respect to the locked portion and come close to the locked portion.

Thus, since the rotational load applied to the output gear 102 by the reverse rotation prevention member can be set to be relatively small, the torque necessary for the driving source to drive the input gear 101 can be maintained to be small.

In addition, while the present exemplary embodiment has been described based on the first exemplary embodiment, the above reverse rotation prevention member may be applied to the configurations of the second and third exemplary embodiments.

Example 5

Next, a fifth exemplary embodiment will be described. The fifth exemplary embodiment is different from the first to fourth exemplary embodiments in that the rotation shaft of the second driving force transmission lever differs from that of the first driving force transmission lever (eccentric shafts). The present exemplary embodiment will be described based on the configuration including the first and second driving force transmission levers as in the first exemplary embodiment. Thus, the components similar to those in the first exemplary embodiment are denoted by the same reference numerals and characters, and redundant description thereof will be avoided.

Figure 14:
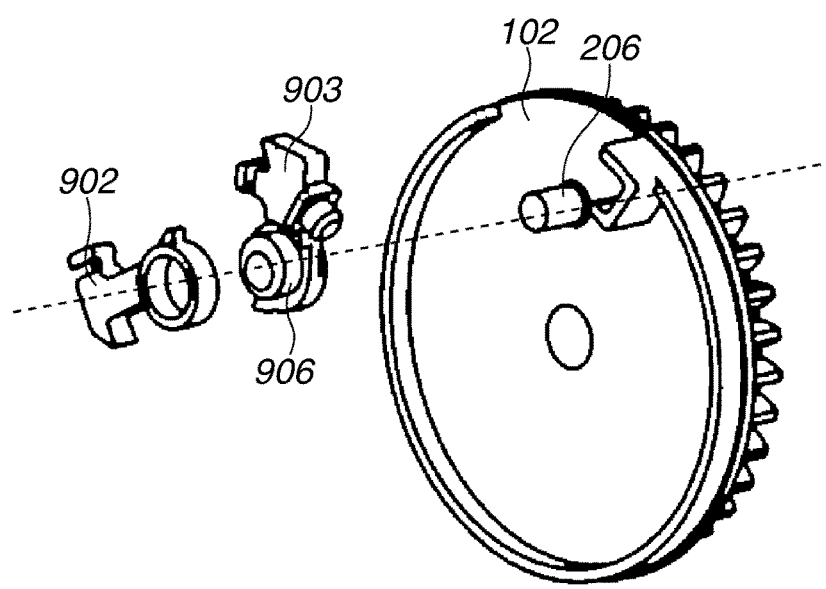
FIG. 14 is a perspective view in which a driving force transmission lever portion is divided.
Figure 15:
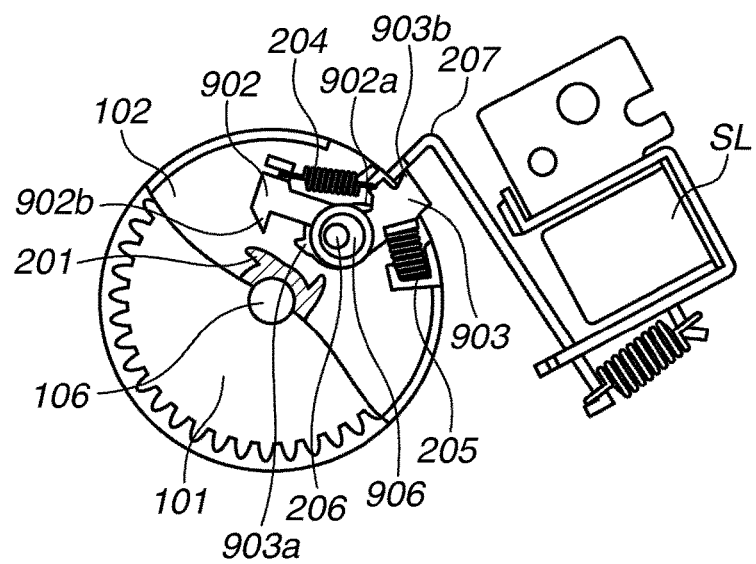
FIG. 15 illustrates a driving force transmission apparatus seen in the axis direction of a rotation center from the input gear side to the output gear side.

FIG. 14 is a perspective view in which a first driving force transmission lever 902, a second driving force transmission lever 903, and the output gear 102 are separated. FIG. 15 illustrates a standby state in which no driving force is transmitted from the input gear 101 to the output gear 102.

Figure 16A:
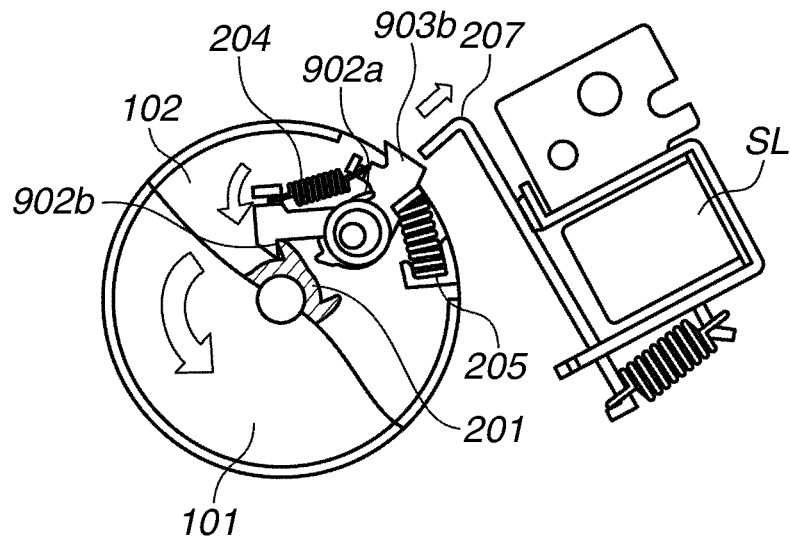
FIG. 16A illustrates the driving force transmission apparatus seen in the axis direction of the rotation center from the input gear side to the output gear side.
Figure 16B:
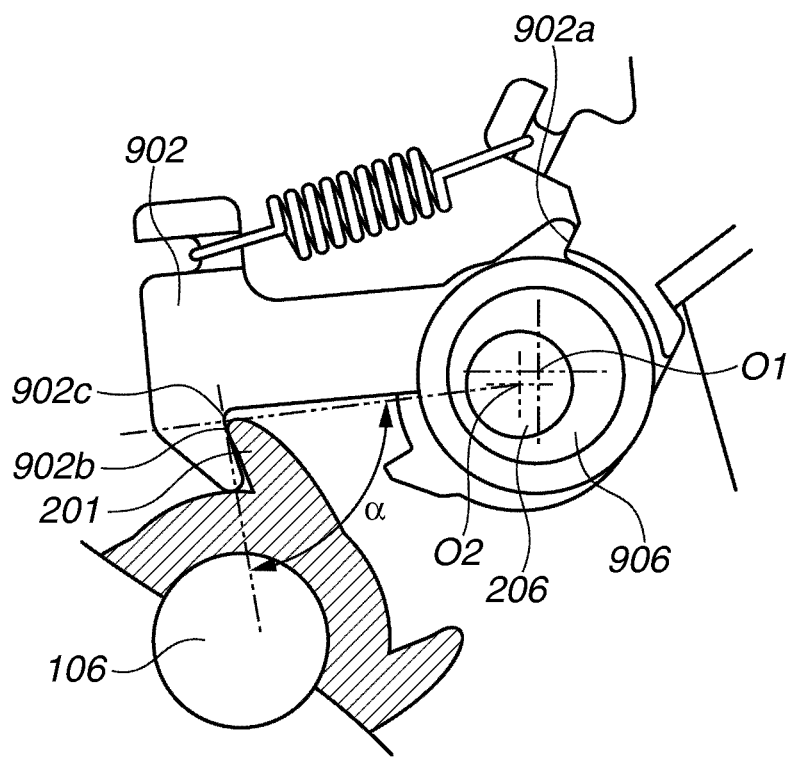
FIG. 16B illustrates the driving force transmission apparatus seen in the axis direction of the rotation center from the input gear side to the output gear side.
Figure 17:
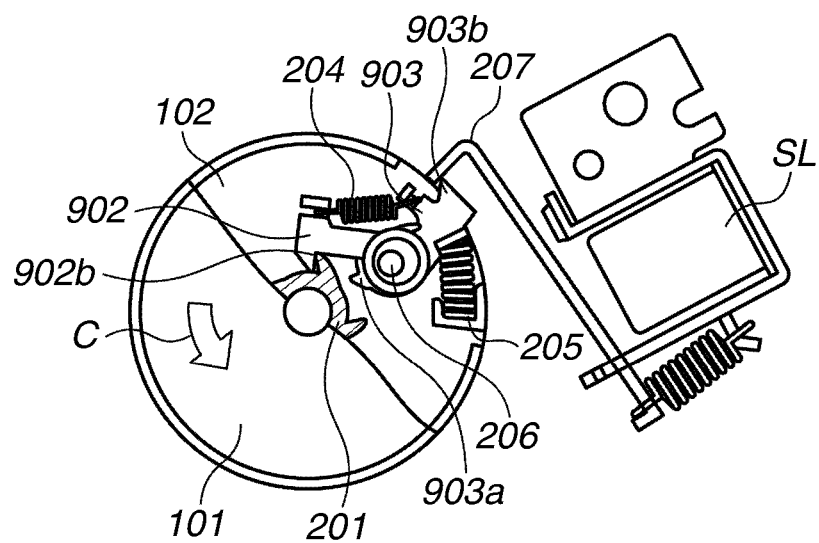
FIG. 17 illustrates the driving force transmission apparatus seen in the axis direction of the rotation center from the input gear side to the output gear side.
Figure 18A:
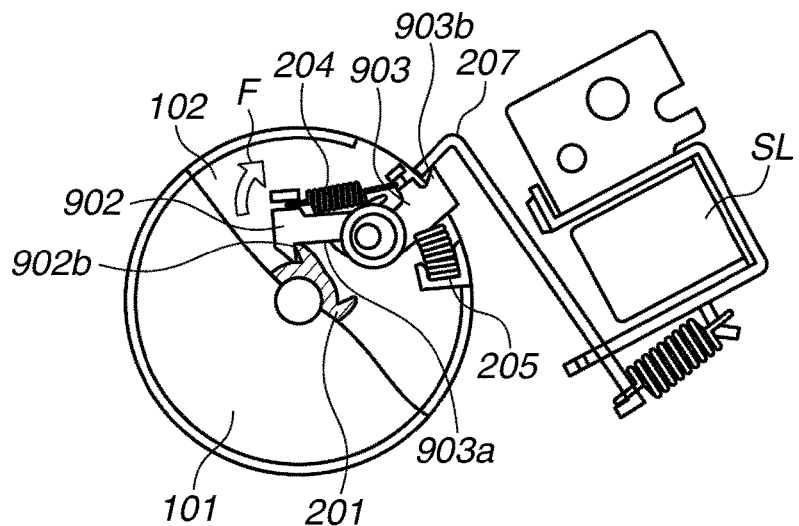
FIG. 18A illustrates the driving force transmission apparatus seen in the axis direction of the rotation center from the input gear side to the output gear side.
Figure 18B:
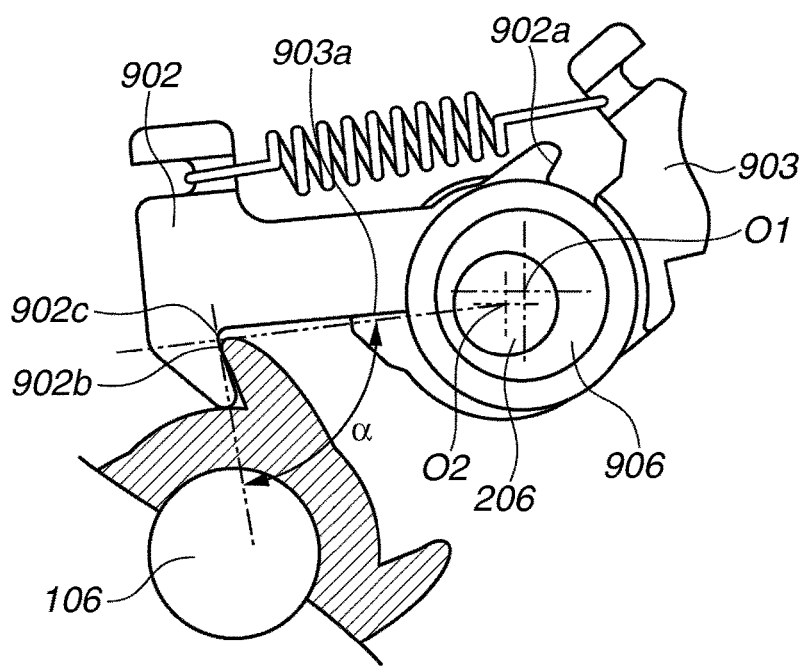
FIG. 18B illustrates the driving force transmission apparatus seen in the axis direction of the rotation center from the input gear side to the output gear side.

FIG. 16A illustrates a state in which driving force is started to be transmitted from the input gear 101 to the output gear 102, and FIG. 16B is an enlarged view of the driving force transmission unit. FIG. 17 illustrates a state in which the second driving force transmission lever 903 comes into contact with the solenoid SL. FIG. 18A illustrates a state in which transmission of the driving force from the input gear 101 to the output gear 102 is started, and FIG. 18B is an enlarged view of the driving force transmission member.

The second driving force transmission lever 903 is rotatable around the rotation shaft 206 (as the axis of rotation) of the output gear 102. The first driving force transmission lever 902 is held rotatably around a rotation shaft 906 (as the axis of rotation) formed on the second driving force transmission lever 903.

The rotation shafts 906 and 206 are different shafts that are parallel to each other (eccentric shafts). In this way, the axis of rotation (the rotation shaft 906) of the first driving force transmission lever 902 differs from that (the rotation shaft 206) of the second driving force transmission lever 903. In addition, since the rotation shaft 906 is arranged on the second driving force transmission lever 903, if the second driving force transmission lever 903 rotates around the rotation shaft 206, the position of the rotation shaft 906 is changed, and the position of the axis of rotation of the first driving force transmission lever 902 is changed.

Next, an operation of the driving force transmission apparatus having the above configuration will be described. First, in the standby state illustrated in FIG. 15, no current flows through the solenoid SL, and the second driving force transmission lever 903 is locked by the flapper 207. In this standby state, the first and second driving force transmission levers 902 and 903 are held while being pulled to each other by the spring 204.

When transmission of driving force is started, the driving force transmission apparatus is brought in a driving force transmission start state illustrated in FIG. 16A. More specifically, the spring 205 rotates the second driving force transmission lever 903 around the rotation shaft 206. Since the first and second driving force transmission levers 902 and 903 are still pulled to each other by the spring 204, the first and second driving force transmission levers 902 and 903 integrally rotate around the rotation shaft 206, and the engaging portion 902b engages with the driving force transmission claw 201 of the input gear 101.

Herein, as illustrated in FIG. 16B, the portion of the engaging portion 902b of the first driving force transmission lever 902 that comes into contact with the driving force transmission claw 201 will be referred to as an abutting portion 902c.

An angle alpha formed by the abutting portion 902c and a line connecting the abutting portion 902c and a center O2 of the rotation shaft 206 is set to be smaller than 90 degrees (more specifically, alpha=88 degrees). In this way, part of the force of the driving force transmission claw 201 pressing the abutting portion 902c functions as moment rotating the first driving force transmission lever 902 to engage with the driving force transmission claw 201.

As a result, the engaging portion 902b of the first driving force transmission lever 902 is prevented from disengaging from the driving force transmission claw 201 after coming into contact with the driving force transmission claw 201, and this engagement is maintained while the driving force to the engaging portion 902b from the driving force transmission claw 201 is transmitted. In addition, since this engagement couples the input and output gears 101 and 102, the driving force is transmitted and the gears are integrally rotated.

As illustrated in FIG. 17, after the first driving force transmission lever 902 engages with the driving force transmission claw 201 and the output gear 102 is rotated, the locked portion 903b of the second driving force transmission lever 903 comes into contact with the flapper 207. In this state, since the engaging portion 902b of the first driving force transmission lever is still engaged with the driving force transmission claw 201, the driving force is still transmitted from the input gear 101 to the output gear 102.

Thus, while the locked portion 903b of the second driving force transmission lever 903 is locked by the flapper 207, the output gear 102 and the first driving force transmission lever 902 are rotated in the direction of arrow C. In this state, the engaging portion 902b of the first driving force transmission lever 902 is pulled by the driving force transmission claw 201, and while being locked, the locked portion 903b of the second driving force transmission lever 903 is pulled by the first driving force transmission lever 902 via the rotation shaft 906.

As a result, the first and second driving force transmission levers 902 and 903 are rotated to move away from each other against the elastic force of the spring 204, and the angle between the first and second driving force transmission levers 902 and 903 is increased. In addition, while the second driving force transmission lever 903 presses the spring 205, the rotation shaft 906 side is rotated around the locked portion 903b.

In this state, as the second driving force transmission lever 903 is rotated around the locked portion 903b and the angle between the first and second driving force transmission levers 902 and 903 is increased, the center O2 of the rotation shaft 206 of the first driving force transmission lever 902 is separated from the rotation center 106 of the input gear 101.

That is, as the second driving force transmission lever 903 is rotated around the locked portion 903b and the angle between the first and second driving force transmission levers 902 and 903 is increased, the center O1 of the rotation shaft 906 comes closer to the line connecting the center O2 of the rotation shaft 206 and the abutting portion 902c. Accordingly, the angle of the first driving force transmission lever 902 with respect to the driving force transmission claw 201 is changed, and the angle alpha formed by the abutting surface 902c and the line connecting the point that is into contact with the driving force transmission claw 201 and the center O1 of the rotation shaft 206 is gradually increased.

Next, when the angle between the first and second driving force transmission levers 902 and 903 is increased to a predetermined angle, as illustrated in FIG. 18A, a stopper 903a comes into contact with the first driving force transmission lever 902. Then, as illustrated in FIG. 18B, the angle alpha formed by the abutting surface 902c and the line connecting the point that is into contact with the driving force transmission claw 201 and the center O1 of the rotation shaft 206 is increased to 90 degrees or more (more specifically, alpha=91 degrees).

Since the first and second driving force transmission levers 902 and 903 are moved to be separated from each other by the force (elastic force) of the spring 204, the first driving force transmission lever 902 is pulled by the force of the spring 204 in the direction of arrow F.

Next, the driving force transmission claw 201 is further rotated, and the output gear 102 is rotated as long as the engaging portion 902b is engaged with the driving force transmission claw 201. However, since the locked portion 903b is locked by the flapper 207, the first and second driving force transmission levers 902 and 903, which are integrated at a maximum angle, are rotated around the shaft 206 in the direction of arrow F.

Thus, the engaging portion 902b of the first driving force transmission lever 902 slides in the direction of arrow F (upward) from the driving force transmission claw 201, while being into contact with the driving force transmission claw 201. In this state, the angle alpha between the abutting surface 902c and the line connecting the point that is into contact with the driving force transmission claw 201 and the center O1 of the rotation shaft 206 is larger than 90 degrees.

Thus, part of the force of the driving force transmission claw 201 pressing the abutting portion 902c functions as moment rotating the first driving force transmission lever 902 away from the driving force transmission claw 201. As a result, the engaging portion 902b is easily disengaged from the driving force transmission claw 201.

If the input gear 101 is rotated further, the engaging portion 902b of the first driving force transmission lever 902 is retracted from the driving force transmission claw 201. When the first driving force transmission lever 902 is rotated by the force of the spring 204 until the stopper 902a comes into contact with the second driving force transmission lever 903, the driving force transmission apparatus returns to the standby state as illustrated in FIG. 15 in which the engaging portion 902b is sufficiently retracted from the driving force transmission claw 201. In this state, since no driving force is transmitted from the input gear 101 to the output gear 102, even if the input gear 101 continues to rotate, the output gear 102 is stopped.

As described above, in the present exemplary embodiment, the rotation shaft 206 of the second driving force transmission lever 903 and the rotation shaft 906 of the first driving force transmission lever 902 are arranged at different positions. In this way, in the driving force transmission state in which the second driving force transmission lever 903 is not locked by the flapper 207, the first driving force transmission lever 902 can engage with the driving force transmission claw 201.

In addition, when transmission of the driving force is stopped, the second driving force transmission lever 903 is locked by the flapper 207, and the first driving force transmission lever 902 can easily be separated from the driving force transmission claw 201. As a result, the first driving force transmission lever 902 can engage with or disengage from the driving force transmission claw 201 without fail, and transmission of the driving force can be executed and stopped without fail.

In the present exemplary embodiment, when the flapper 207 locks the second driving force transmission lever 903, the angle alpha is finally increased to 90 degrees or more.

However, the present exemplary embodiment is not limited to this example. For example, while the angle alpha is 88 degrees in the driving force transmission state in which the second driving force transmission lever 903 is not locked by the flapper 207, the angle alpha may finally be increased to 89 degrees.

In such case, too, as long as the angle alpha when the second driving force transmission lever 903 is locked by the flapper 207 is larger than the angle alpha when the second driving force transmission lever 903 is not locked by the flapper 207, since the first driving force transmission lever 902 is less engaged with the driving force transmission claw 201, the first driving force transmission lever 902 can be disengaged from the driving force transmission claw 201 more easily. As a result, load, which is applied to the first driving force transmission lever 902 (the engaging portion 902b in particular) and the driving force transmission claw 201 when these components are disengaged from each other, can be reduced, and durability can be improved.

Figure 19:
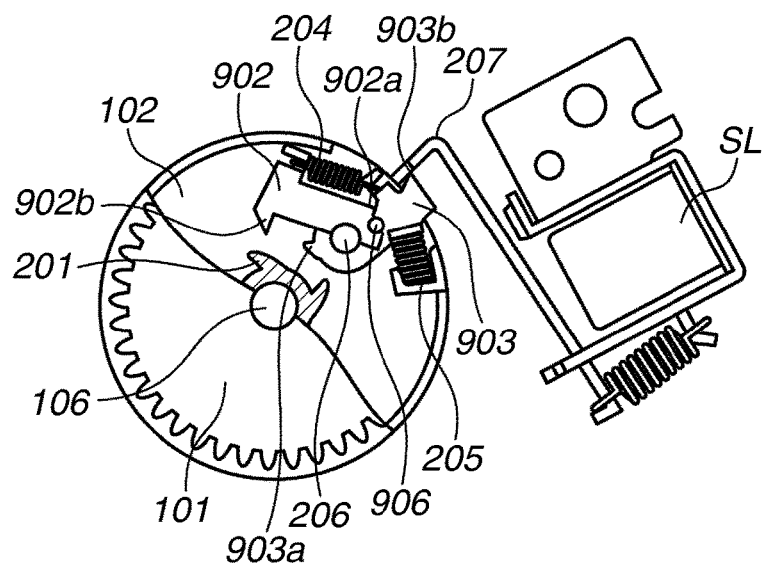
FIG. 19 illustrates the driving force transmission apparatus seen in the axis direction of the rotation center from the input gear side to the output gear side.

In addition, a double shaft structure is used in the present exemplary embodiment. In this structure, the rotation shaft 206 is arranged on the inner side of the rotation shaft 906 of the second driving force transmission lever 903. However, the present exemplary embodiment is not limited to such example. For example, as illustrated in FIG. 19, the rotation shaft 906 of the first driving force transmission lever 902 may be arranged on the second driving force transmission lever 903, and the rotation shaft 206 may be arranged at a different position from the rotation shaft 906.

In any case, the present exemplary embodiment is applicable as long as, when the second driving force transmission lever 903 is locked by the flapper 207, the second driving force transmission lever 903 is rotated around the locked portion 903b, the angle between the first and second driving force transmission levers 902 and 903 is increased, and the center O1 of the rotation shaft 906 comes closer to the line connecting the center O2 of the rotation shaft 206 and the abutting portion 902c.

In this way, the angle of the first driving force transmission lever 902 with respect to the driving force transmission claw 201 is changed, and the angle alpha formed by the abutting surface 902c and the line connecting the point that is in contact with the driving force transmission claw 201 and the center O1 of the rotation shaft 206 is gradually increased. Accordingly, the first driving force transmission lever 902 can disengage from the driving force transmission claw 201 more easily, compared with the driving force transmission state in which the second driving force transmission lever 903 is not locked by the flapper 207.

Example 6

Figure 20:
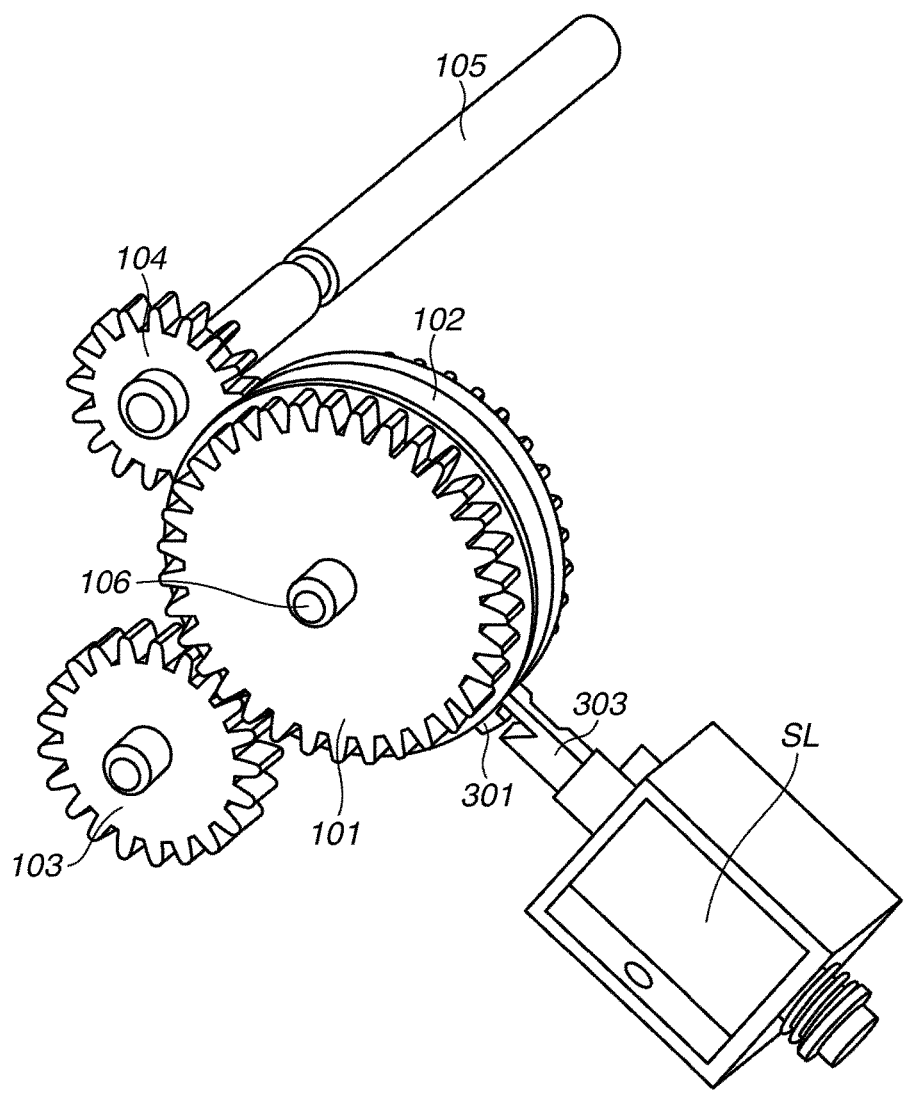
FIG. 20 is a perspective view of a driving force transmission apparatus.

FIG. 20 is a perspective view of a driving force transmission apparatus according to a sixth exemplary embodiment. In the present exemplary embodiment, a single driving force transmission lever is used. The components similar to those in the first exemplary embodiment are denoted by the same reference numerals and characters, and redundant description thereof will be avoided.

The driving force transmission claw 201 and a driving force transmission lever 301 are arranged between the input gear 101 and the output gear 102. Next, a positional relationship of these components will be described.

Figure 21A:
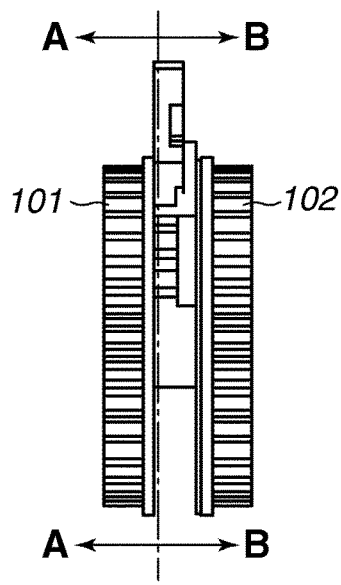
FIG. 21A is a side view of the driving force transmission apparatus seen in a direction perpendicular to the axis of a rotation center.

FIG. 21A is a side view of the driving force transmission apparatus, seen in a direction perpendicular to the axis of the rotation center (rotation shaft) 106.

Figure 21B:
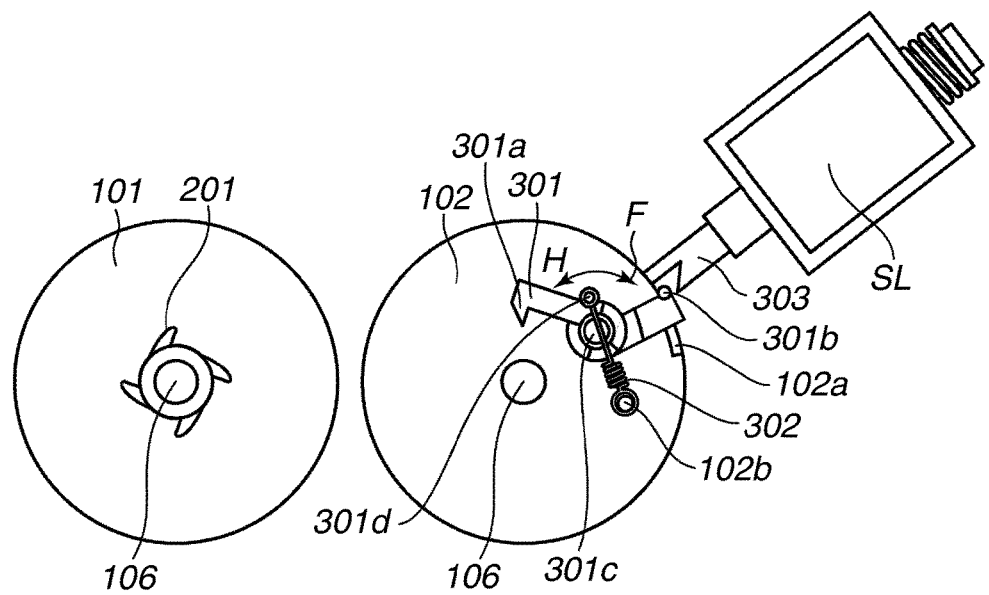
FIG. 21B illustrates an input gear and an output gear divided at positions A-A and B-B in FIG. 21A, the input gear and the output gear being arranged side by side and seen from the inside of the driving force transmission apparatus.

FIG. 21B illustrates the input gear 101 and the output gear 102 divided at positions A-A and B-B in FIG. 21A. These input gear 101 and the output gear 102 are arranged side by side and seen from the inside of the driving force transmission apparatus. That is, in FIG. 21B, the A-A side (left-side) view illustrates the input gear 101 and the B-B side (right-side) view illustrates the output gear 102. The solenoid SL is illustrated in the right-side view.

The driving force transmission claw 201 is integrally formed on the input gear 101 around the rotation shaft. The driving force transmission lever (driving force transmission member) 301 functioning as an engaging member that can engage with the driving force transmission claw 201 is held on a side surface of the output gear 102. This driving force transmission lever 301 can rotate around a shaft 301c, which is different from the rotation center 106 of the output gear 102.

In addition, the driving force transmission lever 301 includes an engaging portion 301a having a shape that can engage with the driving force transmission claw 201 and an abutted portion 301b that comes into contact with an abutting member 303 fixed to the solenoid SL.

A spring 302 is arranged between a tension portion 102b of the output gear 102 and a tension portion 301d of the driving force transmission lever 301, and the driving force transmission lever 301 is biased in a different direction depending on the position thereof. In other words, the spring 302 causes the driving force transmission lever 301 to function as a toggle lever.

Figure 22A:
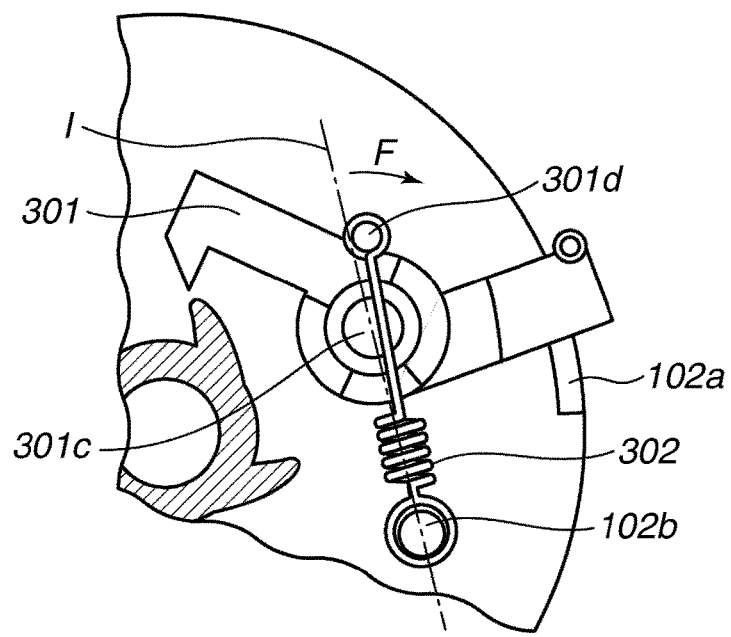
FIG. 22A illustrates the driving force transmission lever seen in the axis direction from the input gear side to the output gear side.
Figure 22B:
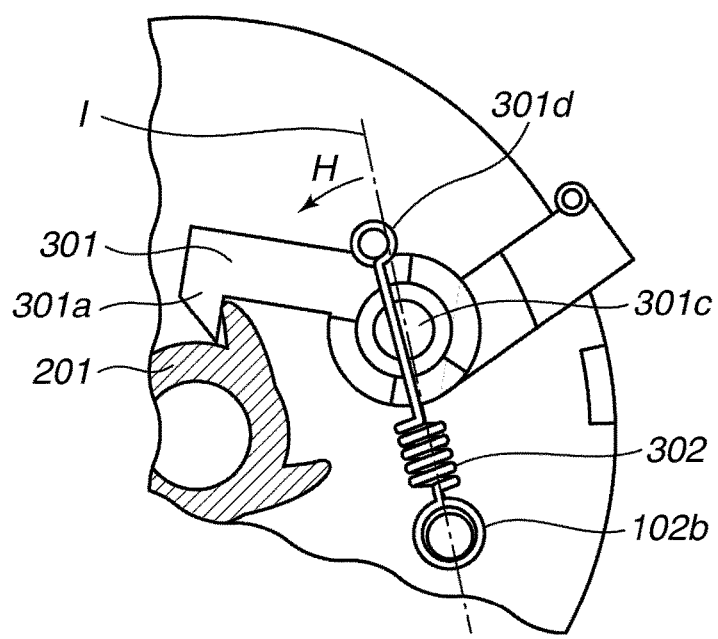
FIG. 22B illustrates the driving force transmission lever seen in the axis direction from the input gear side to the output gear side.

Next, this spring 302 for pushing the driving force transmission lever 301 will be described in detail. FIGS. 22A and 22B illustrate the driving force transmission lever 301 seen in the direction of the shaft 301c from the input gear 101 side to the output gear 102 side. Illustration of parts of the input and output gears 101 and 102 are omitted.

As illustrated in FIG. 22A, when the tension portion 301d of the driving force transmission lever 301 is located on the right side of the line (neutral line) I connecting the tension portion 102b and the shaft 301c, the spring 302 pulls the tension portion 301d to rotate the driving force transmission lever 301 in the direction of arrow F. Accordingly, in this state, the driving force transmission lever 301 is pulled by the spring 302 in the direction of arrow F.

However, when the tension portion 301d of the driving force transmission lever 301 is located on the left side of the line (neutral line) I connecting the tension portion 102b and the shaft 301c, the spring 302 pulls the tension portion 301d to rotate the driving force transmission lever 301 in the direction of arrow H. Accordingly, in this state, the driving force transmission lever 301 is pulled by the spring 302 in the direction of arrow H.

In this way, depending on whether the tension portion 301d of the driving force transmission lever 301 is located on the right or left side of the neutral line I, the direction in which the spring 302 pulls the driving force transmission lever 301 is changed.

In addition, if the driving force transmission lever 301 is pulled in the direction H, the engaging portion 301a engages with the driving force transmission claw 201 of the input gear 101. If the driving force transmission lever 301 is pulled in the direction of arrow F, the engaging portion 301a is rotated in the direction of arrow F to move away from the driving force transmission claw 201 and comes into contact with a stopper 102a of the output gear 102.

Next, an intermittent drive operation of the output gear 102 using the driving force transmission apparatus according to the present exemplary embodiment will be described.

FIGS. 23A, 24A, 25A, 26A, 26B, and 27A illustrate the driving force transmission apparatus seen in the axis direction of the rotation center 106 from the input gear 101 side to the output gear 102 side. For simplicity, the exterior of a diagonally upper half portion of the input gear 101 is hidden.

In addition, FIGS. 23B, 24B, 25B, and 27B are perspective views of the driving force transmission lever 301 and the abutting member 303 in various states. FIGS. 25C and 27C are enlarged views of the abutting member 303 seen in the axis direction of the rotation center 106.

Figure 23A:
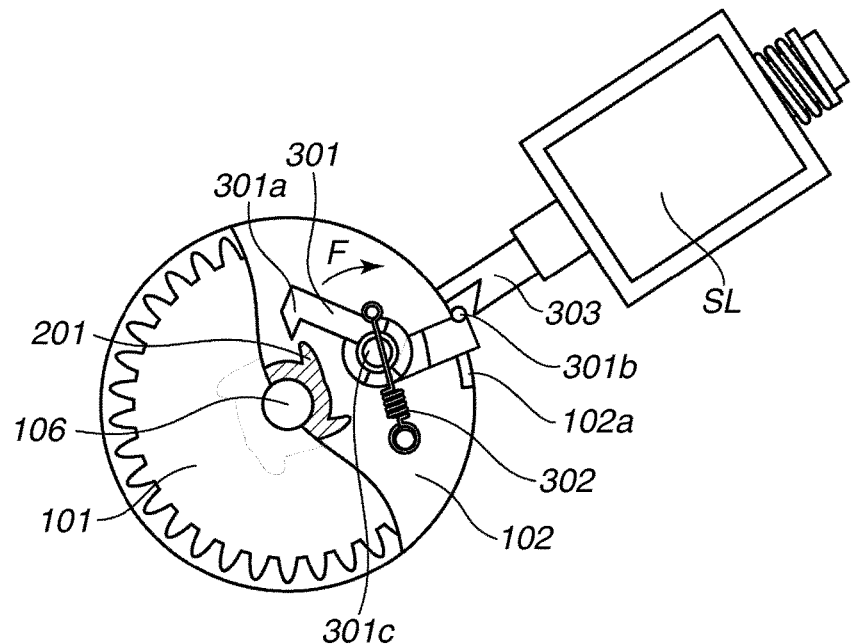
FIG. 23A illustrates the driving force transmission apparatus seen in the axis direction of the rotation center from the input gear side to the output gear side.
Figure 23B:
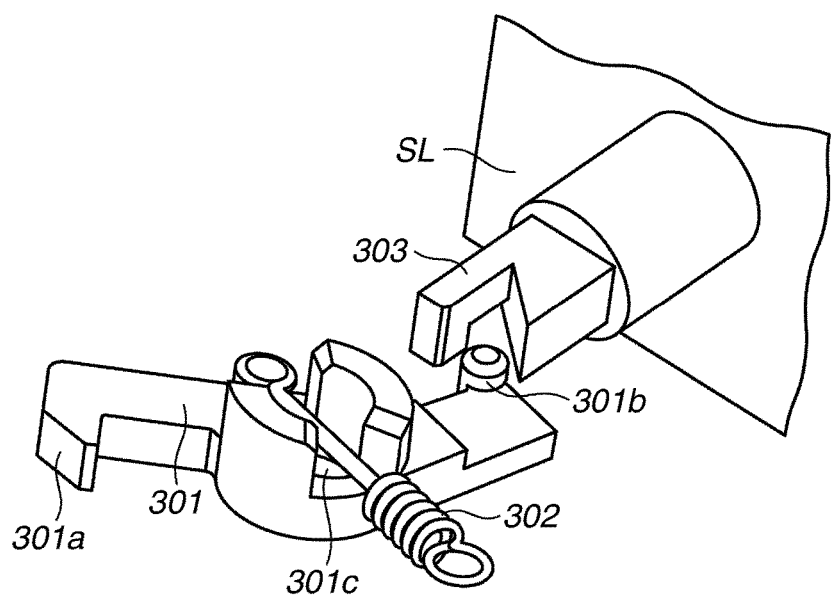
FIG. 23B is a perspective view of the driving force transmission lever and an abutting member.

FIGS. 23A and 23B illustrate a standby state in which no driving force is transmitted from the input gear 101 to the output gear 102 (transmission of driving force is stopped). In this state, the driving force transmission lever 301 is pulled in the direction of arrow F by the spring 302 and is into contact with the stopper 102a, and the engaging portion 301a of the driving force transmission lever 301 is disengaged from the driving force transmission claw 201.

In addition, since no current flows through the solenoid SL, the abutting member 303 fixed to the solenoid SL is retracted to a position away from the shaft 106, and is not in contact with the abutted portion 301b of the driving force transmission lever 301.

Figure 24A:
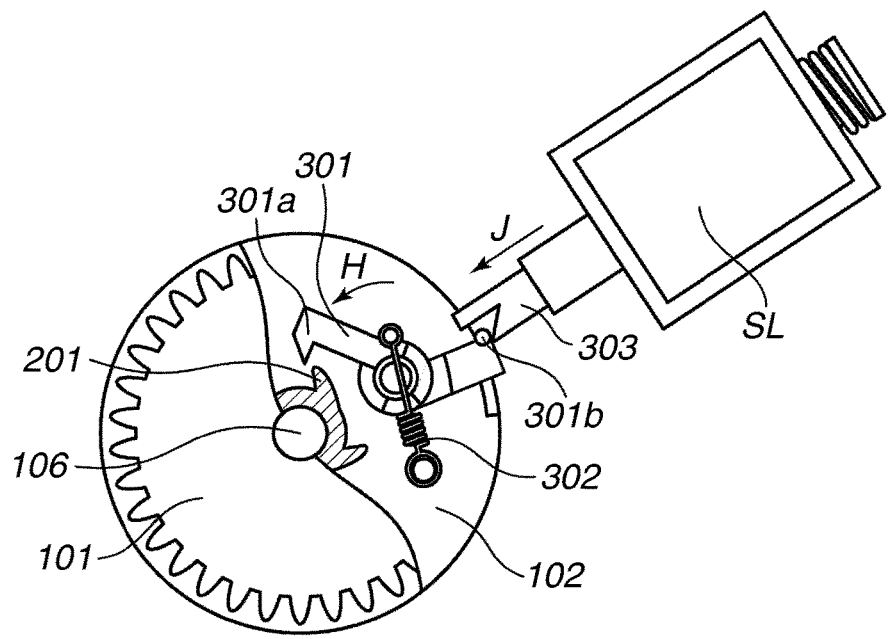
FIG. 24A illustrates the driving force transmission apparatus seen in the axis direction of the rotation center from the input gear side to the output gear side.
Figure 24B:
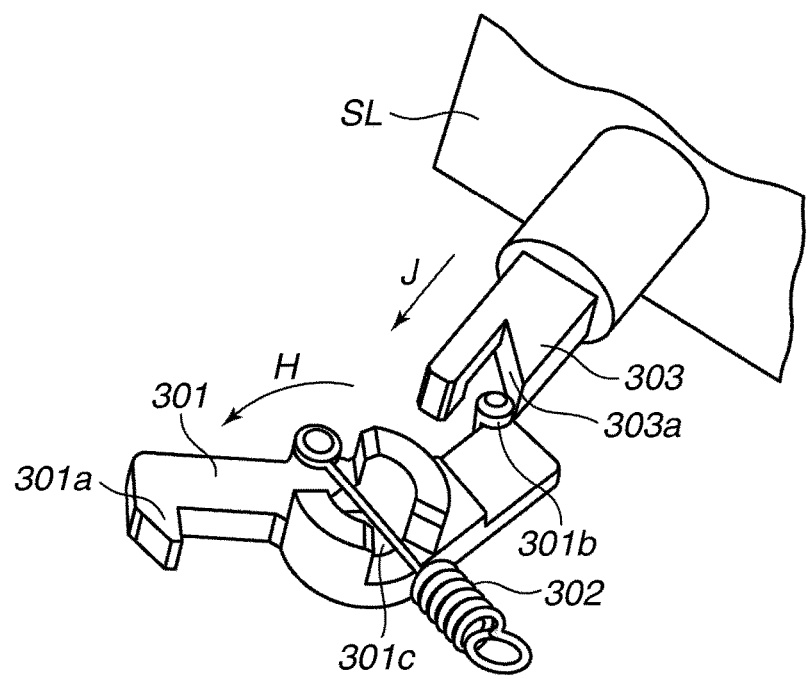
FIG. 24B is a perspective view of the driving force transmission lever and the abutting member.

Next, when a current flows through the solenoid SL, as illustrated in FIGS. 24A and 24B, the abutting member 303 moves in the direction of arrow J (closer to the shaft 106). The abutting member 303 has a pressing surface 303a that presses the abutted portion 301b of the driving force transmission lever 301.

Thus, as the abutting member 303 moves in the direction of arrow J, the pressing surface 303a presses the abutted portion 301b. As a result, the pressing surface 303a rotates the driving force transmission lever 301 in the direction of arrow H against the force of the spring 302 in the direction of arrow F.

Figure 25A:
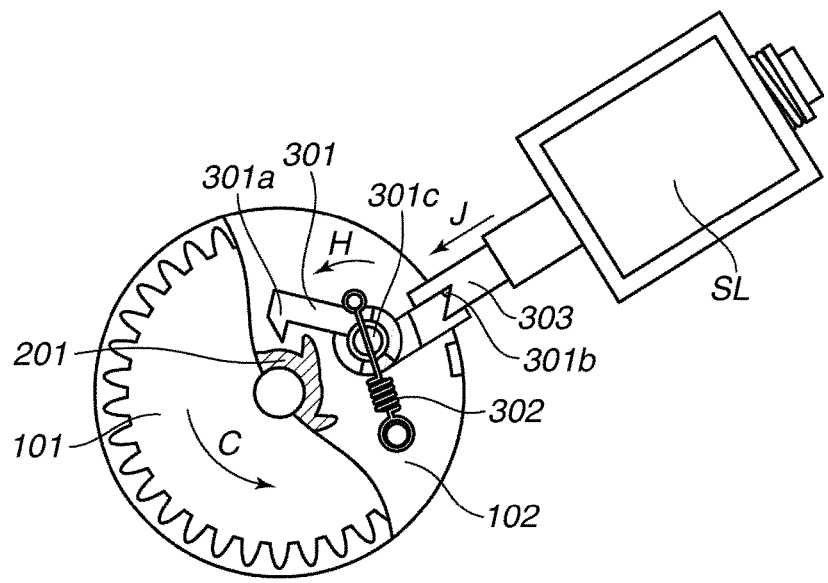
FIG. 25A illustrates the driving force transmission apparatus seen in the axis direction of the rotation center from the input gear side to the output gear side.
Figure 25B:
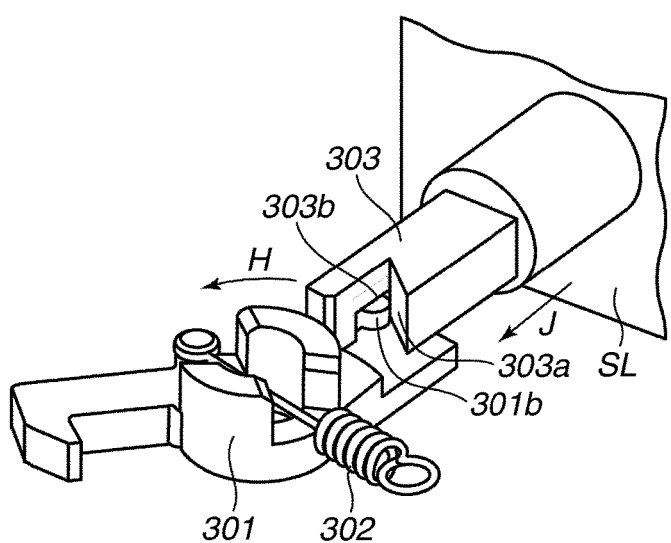
FIG. 25B is a perspective view of the driving force transmission lever and the abutting member.
Figure 25C:
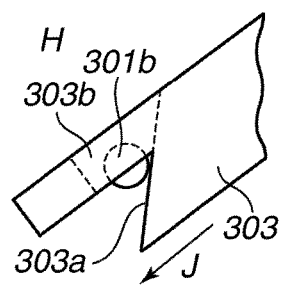
FIG. 25C is an enlarged view of the abutting member seen in the axis direction of the rotation center.

As the abutting member 303 further moves in the direction of arrow J, the driving force transmission apparatus is brought into a state illustrated in FIGS. 25A to 25C. As illustrated in FIGS. 25B and 25C, the abutting member 303 has a notch 303b through which the abutted portion 301b passes, and the pressing surface 303a extends to the inside of the notch 303b.

Thus, the abutted portion 301b moves in the direction of arrow H through the inside of the notch 303b while being in contact with and pressed by the pressing surface 303a. Subsequently, as described above, the tension portion 301d moves across the neutral line I, the direction in which the spring 302 biases the driving force transmission lever 301 is changed from the direction of arrow F to H (see FIG. 22), and the driving force transmission lever 301 is rotated in the direction of arrow H.

In this way, the pressing surface 303a presses the abutted portion 301b, at least until the direction in which the driving force transmission lever 301 is biased is changed to the direction of arrow H. In addition, the notch 303b has a shape that does not prevent movement of the abutted portion 301b in the direction of arrow H.

Figure 26A:
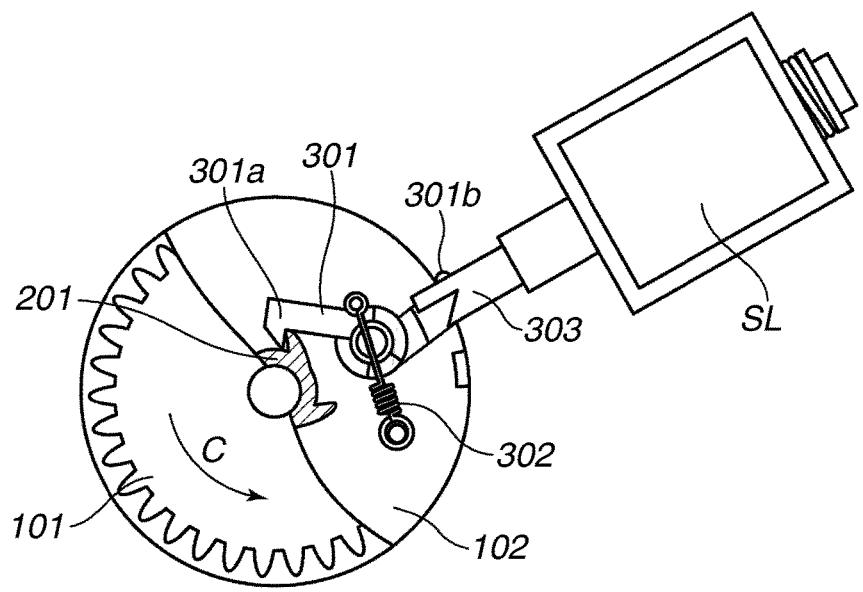
FIG. 26A illustrates the driving force transmission apparatus seen in the axis direction of the rotation center from the input gear side to the output gear side.
Figure 26B:
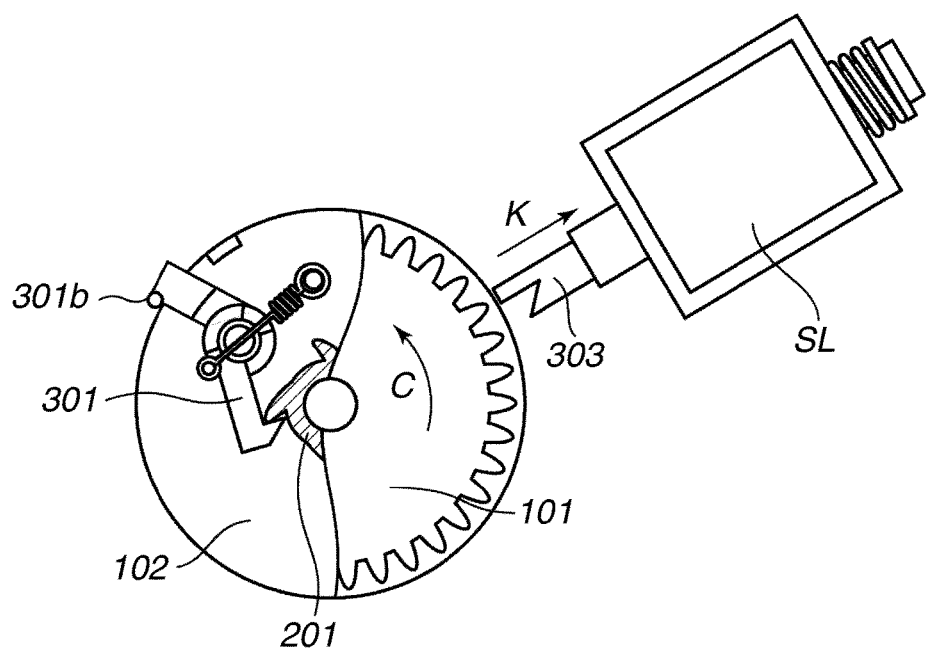
FIG. 26B illustrates the driving force transmission apparatus seen in the axis direction of the rotation center from the input gear side to the output gear side.

Next, when the driving force transmission lever 301 is rotated in the direction of arrow H, as illustrated in FIG. 26A, the engaging portion 301a reaches an engagement position and engages with the driving force transmission claw 201 of the input gear 101 rotating in the direction of arrow C. Thus, driving force is transmitted from the input gear 101 to the output gear 102 via the driving force transmission lever 301, and as illustrated in FIG. 26B, the input gear 101, the driving force transmission lever 301, and the output gear 102 are integrally rotated in the direction of arrow C.

The notch 303b has a shape that does not prevent rotation of the abutted portion 301b in the direction of arrow C when the driving force transmission lever 301 engages with the driving force transmission claw 201 and starts rotating in the direction of arrow C.

In addition, if the current flowing through the solenoid SL is stopped during rotation of the output gear 102, the abutting member 303 moves in the direction of arrow K (opposite to the direction of arrow J) and returns to a locking position where the abutting member 303 can lock the abutted portion 301b of the driving force transmission lever 301.

Figure 27A:
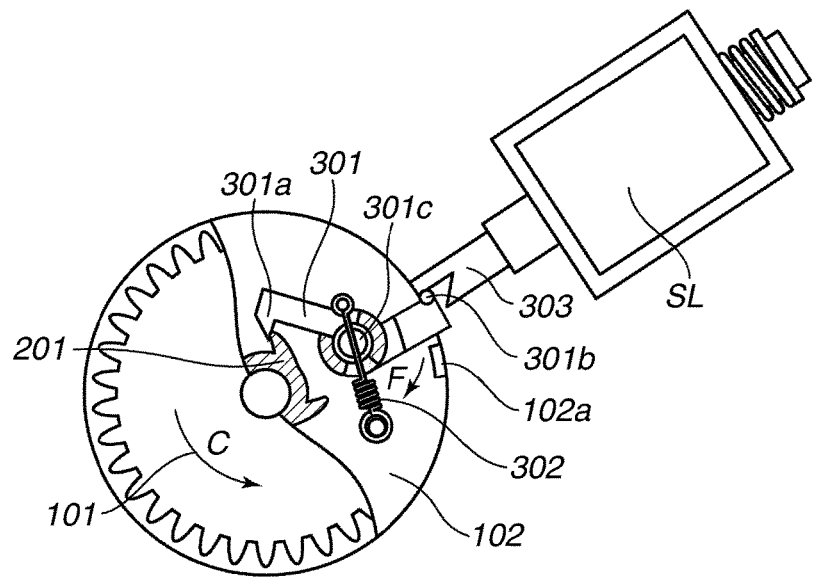
FIG. 27A illustrates the driving force transmission apparatus seen in the axis direction of the rotation center from the input gear side to the output gear side.
Figure 27B:
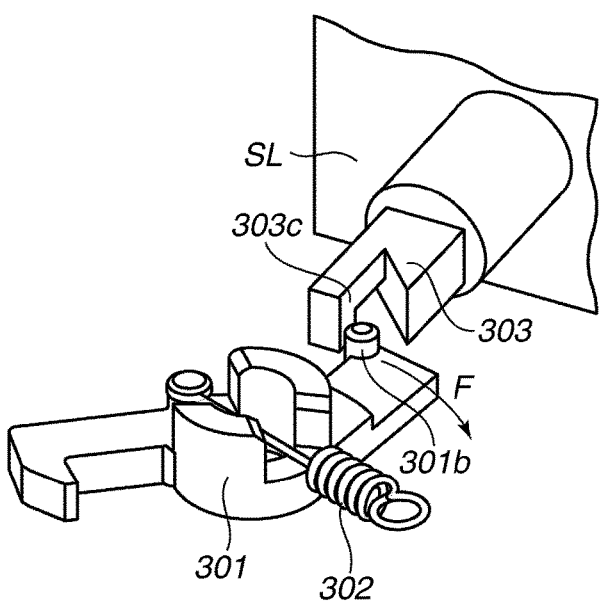
FIG. 27B is a perspective view of the driving force transmission lever and the abutting member.
Figure 27C:
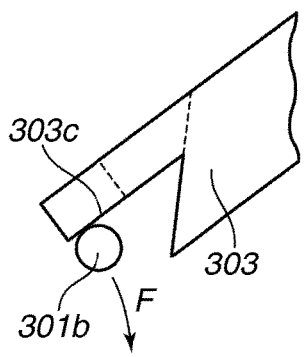
FIG. 27C is an enlarged view of the abutting member seen in the axis direction of the rotation center.

After the output gear 102 rotates one revolution by receiving the driving force from the input gear 101, the driving force transmission apparatus is brought into a state as illustrated in FIGS. 27A to 27C. As illustrated in FIGS. 27B and 27C, the abutting member 303 has a locking surface 303c for locking the abutted portion 301b. When the abutted portion 301b, which has been rotated integrally with the input gear 101 in the direction of arrow C, comes into contact with the locking surface 303c, the abutted portion 301b of the driving force transmission lever 301 is locked by the locking surface 303c.

Meanwhile, since the engaging portion 301a is still engaged with the driving force transmission claw 201, and the driving force is still transmitted from the input gear 101 to the output gear 102 via the driving force transmission lever 301, the output gear 102 continues to rotate in the direction of arrow C. In this way, the shaft 301c of the driving force transmission lever 301 also rotates in the direction of arrow C.

Thus, while the abutted portion 301b is locked by the locking surface 303c of the abutting member 303, the driving force transmission lever 301 is rotated in the direction of arrow F around the shaft 301c against the force of the spring 302. Next, as described above, the tension portion 301d moves across the neutral line I, the direction in which the spring 302 biases the driving force transmission lever 301 is changed from the direction of arrow H to F (see FIG. 22), and the driving force transmission lever 301 is rotated in the direction of arrow F.

In this way, the engaging portion 301a of the driving force transmission lever 301 is retracted (moved in the direction of arrow F) from the driving force transmission claw 201, and is disengaged from the driving force transmission claw 201. When coming into contact with the stopper 102a, the driving force transmission lever 301 stops rotating in the direction of arrow F, and returns to the standby state (standby position) as illustrated in FIG. 23A. Thus, since transmission of the driving force from the input gear 101 to the output gear 102 is stopped, the output gear 102 is stopped.

Between when the abutted portion 301b is locked by the abutting member 303 and when the engaging portion 301a is disengaged from the driving force transmission claw 201, the direction in which the spring 302 biases the driving force transmission lever 301 is changed from the direction of arrow H to F. In this way, after the abutting member 303 locks the abutted portion 301b, the direction in which the spring 302 pulls the driving force transmission lever 301 can be changed without fail.

In addition, when the driving force transmission lever 301 is pulled and moved by the spring 302 in the direction of arrow F, the engaging portion 301a is disengaged from the driving force transmission claw 201 (the tip of the engaging portion 301a is separated from the tip of the driving force transmission claw 201). After the disengagement, the driving force transmission lever 301 continues to move in the direction of arrow F by the force of the spring 302 and comes into contact with the stopper 102a. Therefore, the engaging portion 301a can be moved to a retracted position sufficiently away from the driving force transmission claw 201.

As described above, in the present exemplary embodiment, based on a configuration where driving force is transmitted from the input gear 101 to the output gear 102 via the driving force transmission lever 301 held on the output gear 102, the direction in which the spring 302 pulls the driving force transmission lever 301 to engage the driving force transmission lever 301 with the driving force transmission claw 201 of the input gear 101 can be changed. As a result, when the abutting member 303 locks the driving force transmission lever 301, which has been rotated in the direction of arrow H to engage with the driving force transmission claw 201, the direction in which the driving force transmission lever 301 is pulled is changed to the direction (the direction of arrow F) to move away from the driving force transmission claw 201.

Thus, by the force of the spring 302, the driving force transmission lever 301 can be retracted to a position sufficiently away from the driving force transmission claw 201 without fail. Since the driving force transmission lever 301 can be retracted from the driving force transmission claw 201 without fail, transmission of the driving force can be stopped without fail, and mechanical defects such as generation of a collision noise can be eliminated.

Example 7

Figure 28:
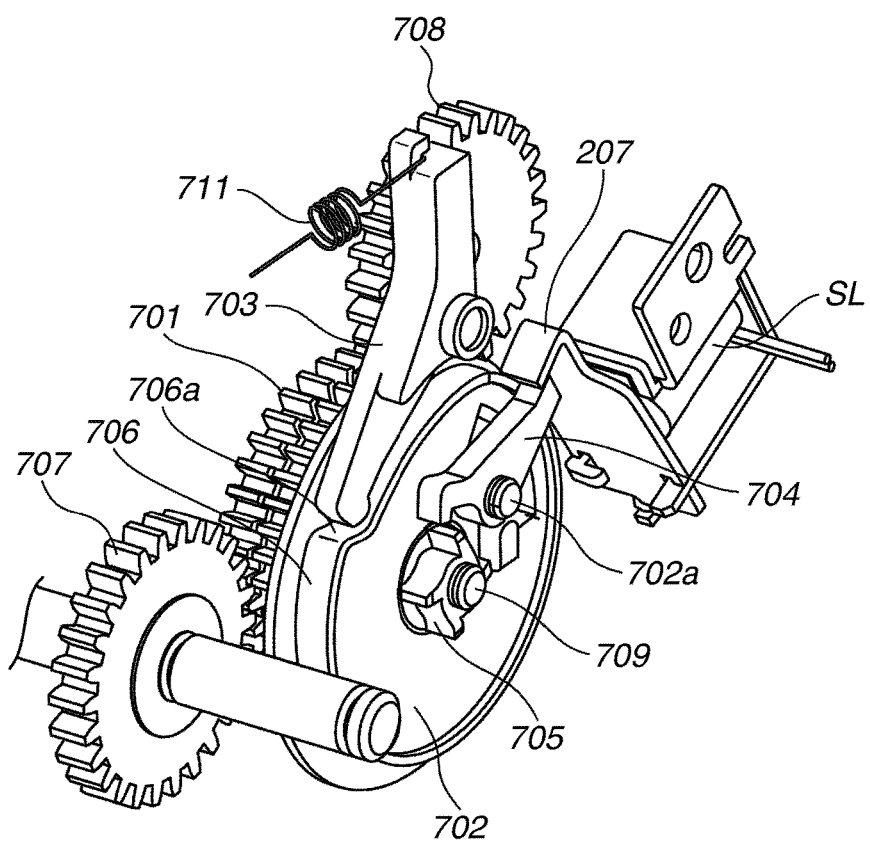
FIG. 28 is a perspective view of a driving force transmission apparatus.

FIG. 28 is a perspective view of a driving force transmission apparatus according to a seventh exemplary embodiment. In the present exemplary embodiment, a single driving force transmission lever is used. The components similar to those in the first exemplary embodiment are denoted by the same reference numerals and characters, and redundant description thereof will be avoided.

Next, this driving force transmission apparatus will be described. This apparatus includes an input gear (driving member) 701, an output gear (driven member) 702, a lever 703, and the solenoid SL. The input gear 701 is coupled to and is rotated by a motor (driving source), which is not illustrated in FIG. 28, via a gear 707.

In addition, via a gear 708, the output gear 702 is coupled to a cam driving gear train for transmitting driving force to the cam of the movement mechanism (not illustrated) for causing the primary transfer rollers 7 to come into contact with or to separate from the intermediate transfer belt.

Both the input gear 701 and the output gear 702 concentrically rotate around a rotation center 709. A driving force transmission claw 705 is formed integrally on the input gear 701 around the rotation shaft 709. A driving force transmission lever (driving force transmission member) 704, which rotates around a shaft 702a different from the rotation center 709 and serves as an engaging member that can engage with the driving force transmission claw 705, is held on a side surface of the output gear 702.

A cam portion 706 including a cam surface 706a is formed integrally with an outer surface of the output gear 702. With this configuration, since the lever (pressing member) 703 pulled by a spring 711 presses this cam surface 706a, the output gear 702 is rotated. As long as the cam portion 706 can rotate integrally with the output gear 702, the cam portion 706 may have an arbitrary shape. For example, a member including the cam portion 706 may be fixed to the output gear 702 by adhesive.

Next, an intermittent drive operation of the output gear 702 using the driving force transmission apparatus will be described with reference to FIGS. 29A to 30B, in which the driving force transmission apparatus is seen in the axis direction of the rotation center 709.

Figure 29A:
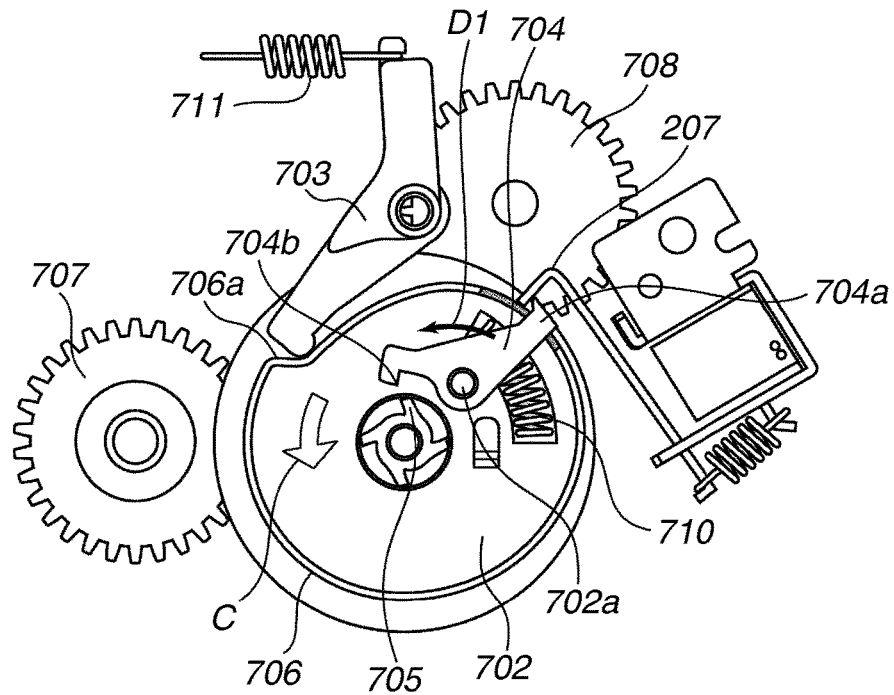
FIG. 29A illustrates the driving force transmission apparatus seen in the axis direction of a rotation center.

FIG. 29A illustrates a standby state in which no current flows through the solenoid SL and the flapper (abutting member) 207 functioning as a locking member for locking the driving force transmission lever 704 locks the driving force transmission lever 704. In this standby state, the driving force transmission lever 704 is in a disengagement position where the driving force transmission claw 705 is disengaged from the driving force transmission lever 704.

Thus, since no driving force is transmitted from the input gear 701 to the output gear 702, the output gear 702 is stopped and only the gears such as the input gear 701 and the gear 707 arranged upstream in the driving force transmission direction are rotated. The input gear 701 is rotated in the direction of arrow C.

Next, when a current flows through the solenoid SL, the flapper 207 retracts from the driving force transmission lever 704, and unlocks the driving force transmission lever 704. Accordingly, a spring 710 arranged between the output gear 702 and the driving force transmission lever 704 presses and rotates the driving force transmission lever 704 in the direction of arrow D1. Subsequently, the driving force transmission lever 704 moves to an engagement position to engage with the driving force transmission claw 705.

Figure 29B:
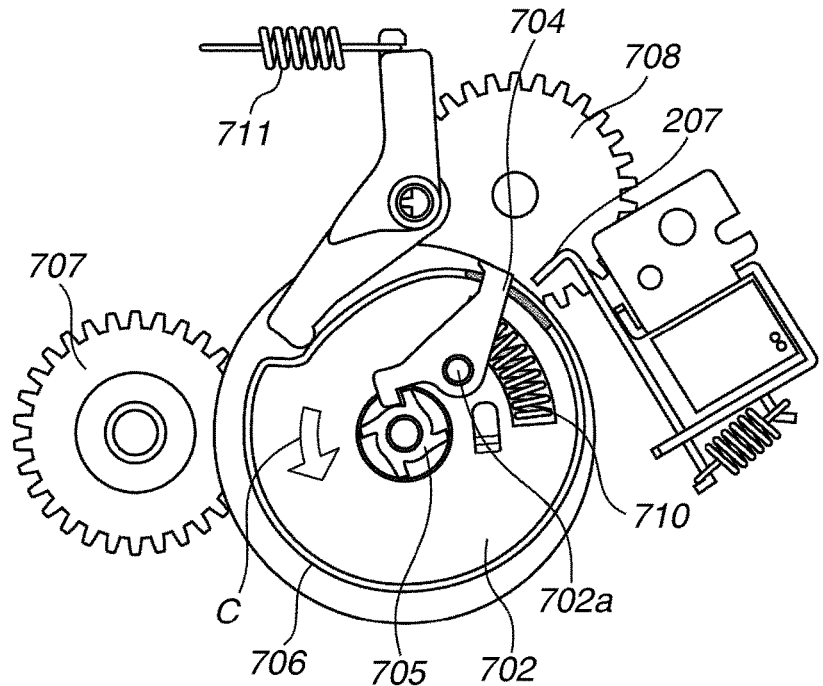
FIG. 29B illustrates the driving force transmission apparatus seen in the axis direction of a rotation center.

Because of this engagement, as illustrated in FIG. 29B, the input gear 701 and the output gear 702 couple to each other via the driving force transmission lever 704, and start rotating integrally in the direction of arrow C. In this way, driving force is transmitted from the output gear 704 to the drive output gear 708. The mechanism of the spring 710 pressing the driving force transmission lever 704 will be described below.

Figure 30A:
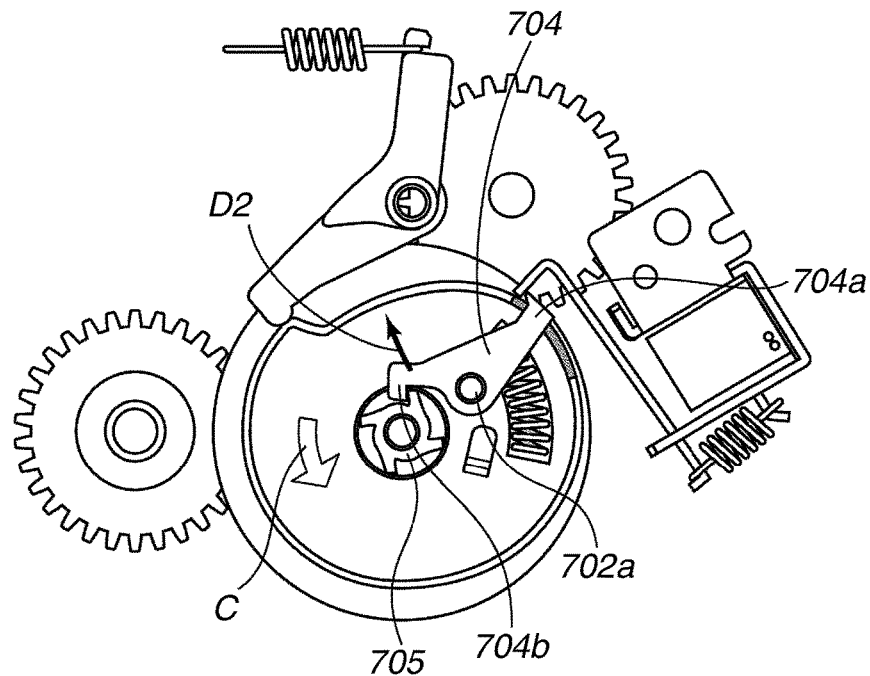
FIG. 30A illustrates the driving force transmission apparatus seen in the axis direction of the rotation center.

Subsequently, when supply of the current flowing through the solenoid SL is stopped, the retracted flapper 207 returns to a locking position where the flapper 207 can lock the driving force transmission lever 704. In this state, as illustrated in FIG. 30A, when the driving force transmission lever 704 integrally rotating with the output gear 702 comes into contact with the flapper 207, the flapper 207 locks a first edge portion 704a of the driving force transmission lever 704.

The moment when the first edge portion 704a of the driving force transmission lever 704 comes into contact with the flapper 207, a second edge portion 704b is still engaged with the driving force transmission claw 705. Consequently, the driving force transmission lever 704 is pulled by the driving force transmission claw 705.

Thus, the driving force transmission lever 704 is rotated in the direction of arrow D2 around the first edge portion 704a that is in contact with the flapper 207, until the second edge portion 704b is disengaged from the driving force transmission claw 705. After the second edge portion 704b is disengaged from the driving force transmission claw 705, since no driving force is transmitted to the output gear 702, the output gear 702 is stopped.

Based on conventional configurations, when the driving force transmission claw 705 is disengaged from the driving force transmission lever 704 and the output gear 702 is stopped, the driving force transmission lever 704 cannot be further retracted from the driving force transmission claw 705. Thus, the driving force transmission lever 704 may not be retracted to a position sufficiently away from the driving force transmission claw 705, when the output gear 702 is stopped.

If this happens, the second edge portion 704b of the driving force transmission lever 704 collides with the tip of the continuously-rotating driving force transmission claw 705, and as a result, a collision noise is caused.

Figure 30B:
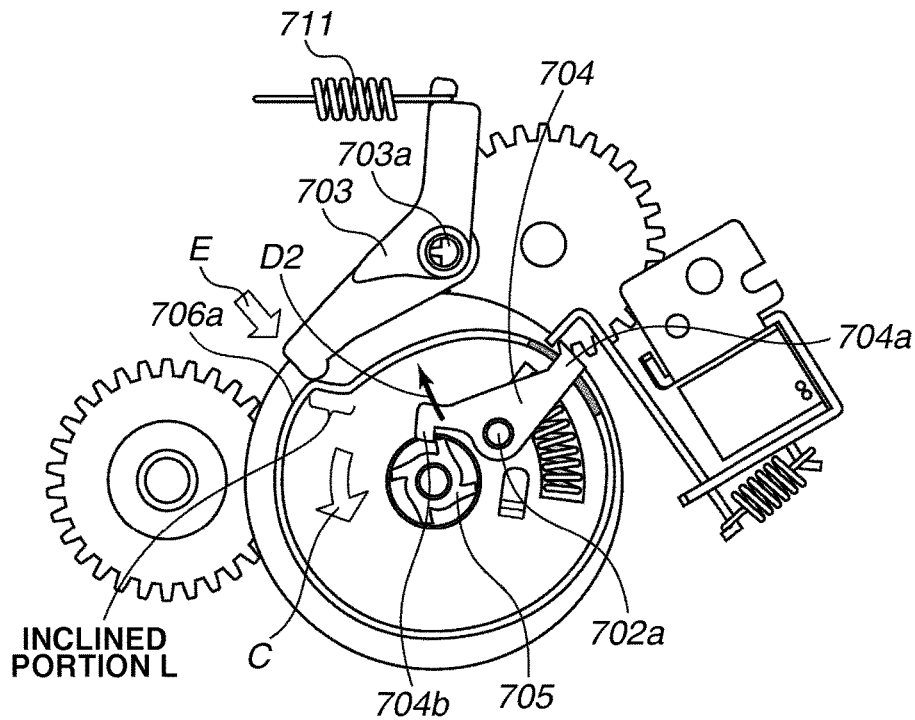
FIG. 30B illustrates the driving force transmission apparatus seen in the axis direction of the rotation center.

Thus, in the present exemplary embodiment, as illustrated in FIG. 30B, the lever 703 pushed by the spring 711 presses the cam surface 706a of the cam portion 706 to rotate the output gear 702. By this rotation of the output gear 702, the driving force transmission lever 704 is retracted to a position sufficiently away from the driving force transmission claw 705. The lever 703 is rotatable around a shaft 703a.

More specifically, when the first edge portion 704a of the driving force transmission lever 704 is in contact with the flapper 207 and the second edge portion 704b is engaged with the driving force transmission claw 705, the tip of the lever 703 presses an inclined portion L of the cam surface 706a in the direction of arrow E. By pressing the inclined portion L of the cam surface 706a in this way, the output gear 702 is supplied with torque and is rotated in the direction of arrow C. With the rotation of the output gear 702, the shaft 702a is also rotated around the rotation center 709 in the direction of arrow C.

Because of this torque, the driving force transmission lever 704 is rotated around the first edge portion 704a in the direction of arrow D2. After the second edge portion 704b is disengaged from the driving force transmission claw 705, the driving force transmission lever 704 is further rotated in the direction of arrow D2. As a result, the second edge portion 704b of the driving force transmission lever 704 can be retracted to a position sufficiently away from the driving force transmission claw 705.

The length and the inclination of the inclined portion L of the cam surface 706a are set so that the rotation of the output gear 702 stops when the second edge portion 704b of the driving force transmission lever 704 is retracted to an appropriate position sufficiently away from the driving force transmission claw 705.

While the driving force transmission lever 704 is retracted from the driving force transmission claw 705 in this way, if this retracting operation of the driving force transmission lever 704 is seen from the viewpoint of the output gear 702, the second edge portion 704b of the driving force transmission lever 704 is rotated around the shaft 702a to move away from the driving force transmission claw 705.

During this rotation, the driving force transmission lever 704 compresses the spring 710. Thus, when the output gear 702 is stopped, the spring 710 is compressed. Accordingly, when the flapper 207 unlocks the driving force transmission lever 704, as described above, the spring 710 is released to press and rotate the driving force transmission lever 704.

Meanwhile, load by the cam, the gear train, and the like (not illustrated) arranged downstream in the driving force transmission direction is applied to the output gear 702 locked and stopped by the flapper 207, and this load serves as rotational resistance when rotating the output gear 702. Thus, the spring pressure of the spring 710 is set to be smaller than the rotational resistance, to prevent the spring pressure of the spring 710 from rotating the output gear 702 clockwise in the figure.

In addition, in the present exemplary embodiment, the output gear 702 is rotated in the direction of arrow C by causing the lever 703 to press the cam portion 706. However, the output gear 702 may be rotated in the direction of arrow C by an actuator such as another solenoid when the first edge portion 704a of the driving force transmission lever 704 comes into contact with the flapper 207.

As described above, in the present exemplary embodiment, when the driving force transmission lever 704 is locked by the flapper 207, the lever 703 presses the inclined portion L of the cam surface 706a, which then rotates the output gear 702. In this way, the driving force transmission lever 704 can be retracted to a position sufficiently away from the driving force transmission claw 705 without fail. Since the driving force transmission lever 704 can be retracted from the driving force transmission claw 705 without fail, transmission of the driving force can be stopped without fail and mechanical defects such as generation of a collision noise can be eliminated.

In each of the above first to seventh exemplary embodiments, a driving force transmission apparatus according to the present invention is applied to a movement mechanism of an image forming apparatus. However, the driving force transmission apparatus of the present invention is not limited thereto, and the driving force transmission apparatus of the present invention is applicable to switching of driving of a paper feed unit of an image forming apparatus, to a mechanism for causing the development roller 3 and the photosensitive drum 1 to come into contact with or to be separated from each other, to switching of driving of a toner supply unit, to another driving force transmission unit, or to an apparatus including a driving force transmission unit, the apparatus being other than an image forming apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-251596 filed Nov. 17, 2011, No. 2011-251597 filed Nov. 17, 2011, No. 2011-251598 filed Nov. 17, 2011, and No. 2012-234027 filed Oct. 23, 2012, which are hereby incorporated by reference herein in their entirety.

The invention claimed is:

1. A driving force transmission apparatus; comprising:
a driving member configured to rotate by receiving driving force from a driving source;
a driven member configured to concentrically rotate with the driving member by receiving driving force from the driving member;
an engaging portion configured to be movably held on the driven member and to be engageable with the driving member;
an abutted portion configured to be movably held on the driven member;
an abutting member configured to be movable between a contact position at which the abutting member is in contact with the abutted portion and a non-contact position at which the abutting member is not in contact with the abutted portion, wherein the engaging portion separates from the driving member in a case where the abutting member is positioned at the contact position; and
a biasing member configured to bias the engaging portion,
wherein, when the engaging portion is engaged with the driving member, driving force is transmitted from the driving member to the driven member via the engaging portion, wherein, when the engaging portion is disengaged from the driving member, transmission of the driving force from the driving member to the driven member is stopped, wherein the biasing member is disposed between the engaging portion and the abutted portion, wherein biasing force by the biasing member acts on the engaging portion and the abutted portion in directions in which the engaging portion and the abutted portion are attracted to each other, and wherein, when the abutting member is in contact with the abutted portion and the engaging portion is engaged with the driving member, the biasing member biases the engaging portion in a direction where the engaging portion is disengaged from the driving member.

2. The driving force transmission apparatus according to claim 1, wherein, when the engaging portion is disengaged from the driving member, the engaging portion is moved by biasing force of the biasing member in a direction where the engaging portion is separated away from the driving member.

3. The driving force transmission apparatus according to claim 1,
wherein the biasing member is arranged to act between the abutted portion and the engaging portion, and
wherein, while the engaging portion is engaged with the driving member, between when the abutting member comes into contact with the abutted portion and when the engaging portion is disengaged from the driving member, the engaging portion is moved with respect to the abutted portion against the biasing force of the biasing member.

4. The driving force transmission apparatus according to claim 3, further comprising a regulating portion configured to regulate the movement of the engaging portion with respect to the abutted portion against the biasing force of the biasing member more than a predetermined amount.

5. The driving force transmission apparatus according to claim 1, wherein the biasing member is a first biasing member, the driving force transmission apparatus further comprising a second biasing member configured to bias the abutted portion,
wherein, when the abutting member is not in contact with the abutted portion, the second biasing member biases a force on the engaging portion via the abutted portion to engage the engaging portion with the driving member.

6. The driving force transmission apparatus according to claim 1, further comprising a second biasing member configured to bias the abutted portion,
wherein, when the abutting member is not in contact with the abutted portion, the second biasing member, via the abutted portion, biases the engaging portion to engage with the driving member against the biasing force of the first biasing member.

7. The driving force transmission apparatus according to claim 1, wherein the abutted portion and the engaging portion are rotatably held on the driven member around a shaft arranged on the driven member.

8. The driving force transmission apparatus according to claim 1, wherein the engaging portion is rotatably held on the abutted portion around a first shaft arranged on the abutted portion, and the abutted portion is rotatably held on the driven member around a second shaft arranged on the driven member.

9. The driving force transmission apparatus according to claim 8, wherein an angle between an engaging surface that is a surface including an abutting point with which the driving member being contacted and a line formed by connecting the abutting point and the second shaft is larger when the abutted portion is in contact with the abutting member than when the abutted portion is not in contact with the abutting member.

10. The driving force transmission apparatus according to claim 1, comprising a reverse rotation prevention member configured to prevent rotation of the driven member in a direction, which is opposite to a direction in which the driven member is rotated by receiving the driving force from the driving member, when the engaging portion is disengaged from the driving member.

11. The driving force transmission apparatus according to claim 1, wherein, when the abutting member comes into contact with the abutted portion and when the engaging portion is moved from a state in which the engaging portion is engaged with the driving member to the direction where the engaging portion is disengaged from the driving member, a direction in which the biasing member biases the engaging portion is changed from a direction in which the engaging portion is engaged with the driving member to the direction in which the engaging portion is disengaged from the driving member.

12. The driving force transmission apparatus according to claim 11,
wherein the abutting member is movable, and
wherein, when the biasing member biases the engaging portion in the direction where the engaging portion is disengaged from the driving member, by causing the abutting member to move and press the abutted portion in a direction where the engaging portion is engaged with the driving member, the direction in which the biasing member biases the engaging portion is changed to the direction in which the engaging portion is engaged with the driving member.

13. The driving force transmission apparatus according to claim 11, wherein, when the engaging portion is disengaged from the driving member, the engaging portion is moved in a direction where the engaging portion is separated away from the driving member by the biasing force of the biasing member.

14. An image forming apparatus comprising:
the driving force transmission apparatus according to claim 1; and
an image forming unit.

15. The driving force transmission apparatus according to claim 1, wherein, while the abutting member locks the abutted portion, the driving member and the driven member rotate so that the engaging portion is pulled by the driving member and the abutted portion is pulled by the driven member such that the engaging portion and the abutted portion are moved to be separated away from each other against the force of the biasing member and, when a distance between the engaging portion and the abutted portion is increased to a predetermined distance, the force of the biasing member is increased to a force that pulls the engaging portion away from the driving member to a position where the engaging portion and the driving member are disengaged and cannot reengage.

* * * * *